United States Patent
Shigemura

(10) Patent No.: US 10,632,953 B2
(45) Date of Patent: Apr. 28, 2020

(54) AIRBAG DEVICE

(71) Applicant: TOYODA GOSEI CO., LTD., Kiyosu-shi, Aichi-ken (JP)

(72) Inventor: Takashi Shigemura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 140 days.

(21) Appl. No.: 15/912,707

(22) Filed: Mar. 6, 2018

(65) Prior Publication Data
US 2018/0281733 A1    Oct. 4, 2018

(30) Foreign Application Priority Data

Mar. 30, 2017   (JP) .................................. 2017-68788

(51) Int. Cl.
| | |
|---|---|
| *B60R 21/217* | (2011.01) |
| *B60R 21/206* | (2011.01) |
| *B60R 21/264* | (2006.01) |
| *B60R 21/00* | (2006.01) |
| *B60R 21/26* | (2011.01) |
| *B60R 21/231* | (2011.01) |

(52) U.S. Cl.
CPC ........ *B60R 21/2171* (2013.01); *B60R 21/206* (2013.01); *B60R 21/264* (2013.01); *B60R 2021/0051* (2013.01); *B60R 2021/23169* (2013.01); *B60R 2021/26076* (2013.01)

(58) Field of Classification Search
CPC . B60R 21/206; B60R 21/2171; B60R 21/261; B60R 21/262; B60R 2021/0051; B60R 2021/23169; B60R 21/264; B60R 2021/23076
See application file for complete search history.

(56) References Cited

U.S. PATENT DOCUMENTS 6,837,513 B2 *  1/2005  Oka .................... B60R 21/2176
                                                    280/728.2
6,976,700 B2 * 12/2005  McCann ............. B60R 21/2171
                                                    280/728.2

(Continued)

FOREIGN PATENT DOCUMENTS

JP         2014-73823 A        4/2014
JP         2014196063 A   *   10/2014

*Primary Examiner* — Laura Freedman
(74) *Attorney, Agent, or Firm* — Posz Law Group, PLC

(57) ABSTRACT

A retainer and an inflator are disposed inside the airbag. The retainer includes a mounting base section, a holding section which extends from the mounting base section and receives and holds an inflator therein, and a second mounting means which protrudes from the mounting base perpendicularly. The inflator includes a cylindrical body provided with a gas release section and, a first mounting means protruding from a region of the body disposed outside the airbag. The retainer further includes a storing dent section which receives the first mounting means of the inflator so as to conform an orientation of the first means to that of the second mounting means and, a pressing section disposed proximate the storing dent section. The pressing section is brought into close contact with a circumferential area of the body of the inflator when the first mounting means of the inflator is secured to a vehicle body.

4 Claims, 23 Drawing Sheets

(56) References Cited

U.S. PATENT DOCUMENTS

| | | | |
|---|---|---|---|
| 7,938,436 B2* | 5/2011 | Lunt | ................... B60R 21/2171 |
| | | | 280/728.2 |
| 8,684,399 B2* | 4/2014 | Honda | ................ B60R 21/2171 |
| | | | 280/728.2 |
| 9,278,662 B2* | 3/2016 | Hotta | .................. B60R 21/2171 |
| 2018/0281732 A1* | 10/2018 | Shigemura | ............ B60R 21/233 |
| 2018/0281734 A1* | 10/2018 | Shigemura | .......... B60R 21/2171 |
| 2018/0281735 A1* | 10/2018 | Shigemura | ............ B60R 21/217 |
| 2019/0118757 A1* | 4/2019 | Okayama | ............ B60R 21/2171 |

* cited by examiner

FIG. 20
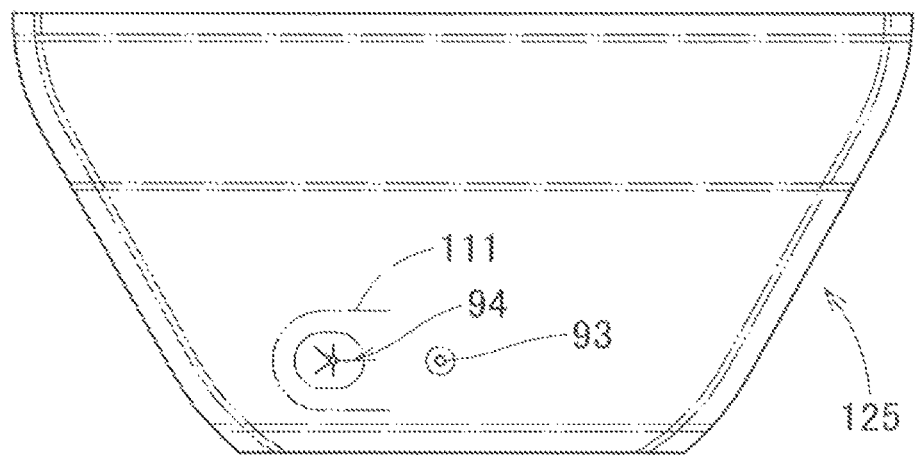
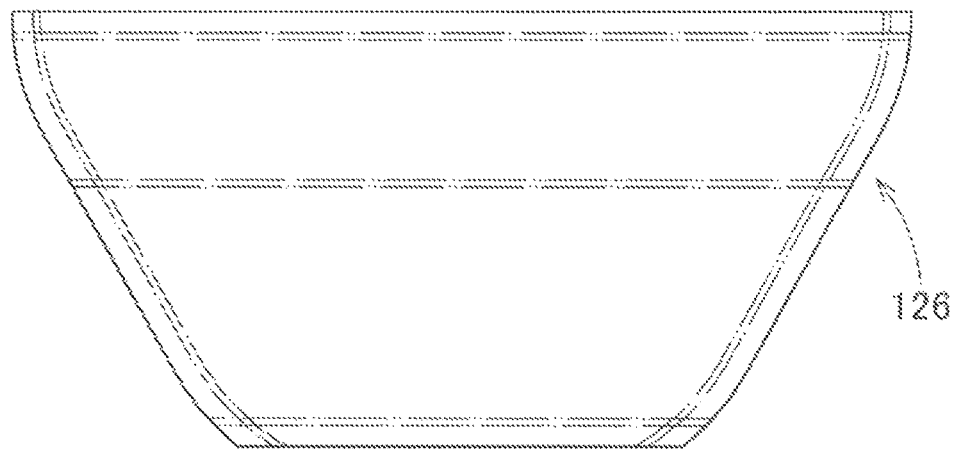

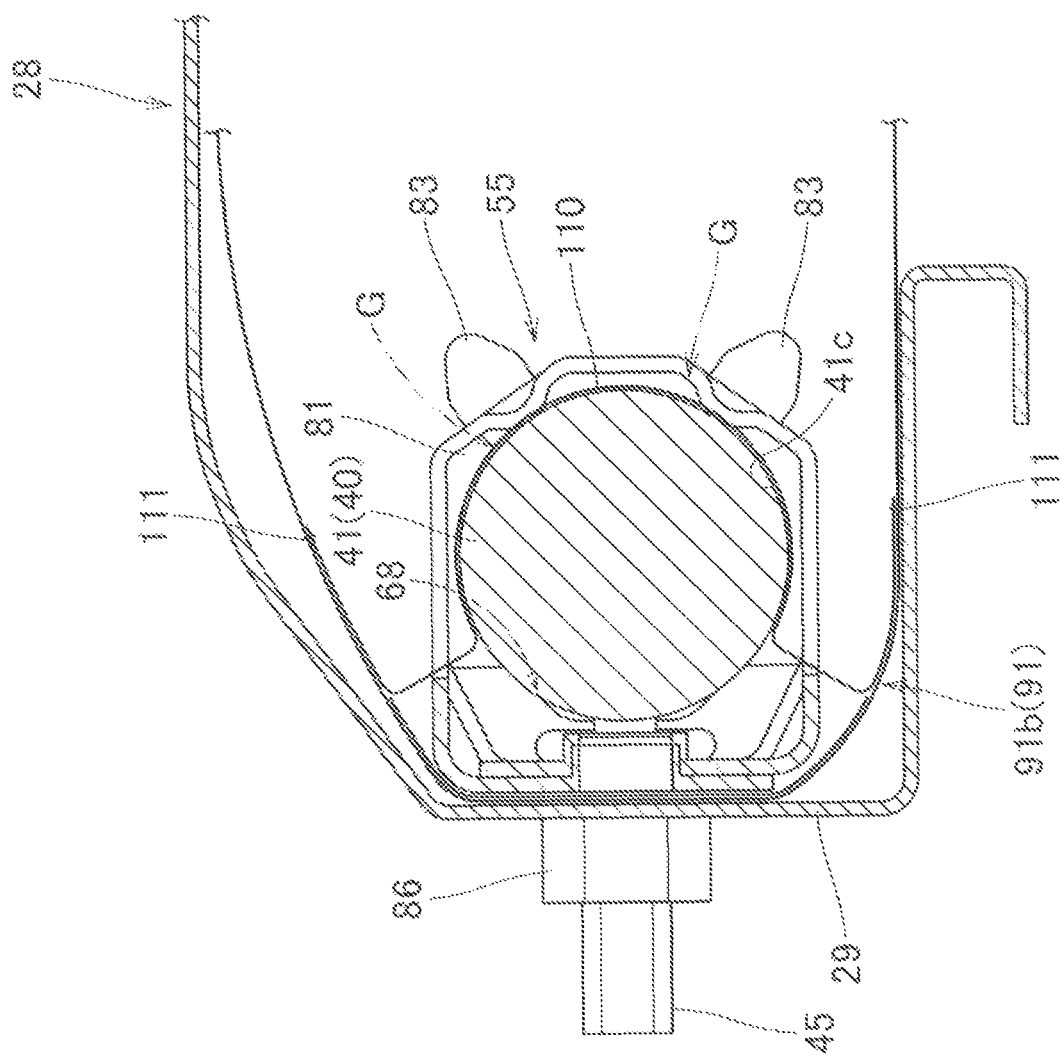

AIRBAG DEVICE

CROSS REFERENCE TO RELATED APPLICATIONS

The present application claims priority from Japanese Patent Application No. 2017-068788 of Shigemura, filed on Mar. 30, 2017, the entire disclosure of which is incorporated herein by reference.

BACKGROUND OF THE INVENTION

1. Field of the Invention

The present invention relates to an airbag device which includes an airbag, an inflator for feeding the airbag with an inflation gas, and a retainer used to mount the airbag and inflator on the vehicle body structure.

2. Description of Related Art

JP 2014-73823 A discloses a known airbag device which includes an airbag, a generally cylindrical inflator for feeding the airbag with an inflation gas, and a retainer which holds the inflator and mounts the airbag and inflator on a vehicle body member. The inflator includes a fixing means at its first end portion in the axial direction. The fixing means is arranged to protrude in a direction generally perpendicular to the axial direction of the inflator. The retainer includes a holding section for holding the inflator, and the holding section is provided with a dent-like portion for receiving the fixing means of the inflator. Positioning of the inflator with respect to the holding section of the retainer is conducted by setting the fixing means inside the dent-like portion.

When assembling this kind of airbag device, the retainer is firstly placed inside the airbag, and then the inflator is put in the airbag so as to be set in the holding section of the retainer. However, at this time, the first end portion of the inflator which is provided with the fixing means is disposed outside of the airbag, and the inflator and the airbag are mounted on the vehicle body member in that state. This configuration may cause a gas leakage via a gap between the holding section of the retainer and the inflator, and therefore some measures need to be taken against gas leakage.

SUMMARY OF THE INVENTION

An object of the present invention is to provide an airbag device for a vehicle that is capable of inflating an airbag smoothly with little fear of gas leakage via a gap between an inflator and a retainer.

The airbag device of the invention is adapted to be mounted on a member of a vehicle, and includes an airbag inflatable with an inflation gas, an inflator for feeding the airbag with the inflation gas, and a retainer which is used to mount the airbag and the inflator on the member of the vehicle.

The inflator includes a generally cylindrical body provided with a gas release section and a first mounting means. The first mounting means protrudes out of a first end region of the body in a direction generally perpendicular to an axis of the body. The first mounting means is adapted to be mounted on the member of the vehicle to mount the airbag and inflator on the member of the vehicle.

The retainer holds the inflator such that the location of the gas release section is disposed inside the airbag and the first end region provided with the first mounting means protrudes out of an insert opening of the airbag. The retainer includes a mounting base section that is adapted to be disposed generally along the member of the vehicle, a generally tubular holding section that is disposed inside the airbag and extends from the mounting base section for receiving and holding the inflator, and a second mounting means that is disposed at a first end region of the mounting base section. The second mounting means protrudes in a direction generally perpendicular to the axis of the inflator and goes through and projects out of the airbag. The second mounting means is adapted to be mounted on the member of the vehicle together with the first mounting means of the inflator in order to mount the airbag and the inflator on the member of the vehicle.

The mounting base section includes a storing dent section for receiving the fix first mounting means of the inflator so as to conform a protruding orientation of the first mounting means to that of the second mounting means. The storing dent section is disposed at a second end region of the mounting base section distant from the second mounting means. The mounting base section further includes a pressing section that is adapted to be brought into close contact with a circumferential area of the body of the inflator facing towards the mounting base section when the first mounting means of the inflator is secured to the member of the vehicle. The pressing section is disposed at a position between the second mounting means of the retainer and the storing dent section and proximate to the storing dent section.

In the airbag device of the invention, the mounting base section of the retainer includes, between the second mounting means and the storing dent section and proximate to the storing dent section, the pressing section which is adapted to be brought into close contact with a predetermined circumferential area of the body of the inflator when the airbag device is secured to the member of the vehicle through the use of the first mounting means of the inflator. The pressing section is capable of preventing an inflation gas, which has exited the gas release section of the inflator and flown through a gap between the mounting base section and the body of the inflator, from further flowing towards the first mounting means of the inflator. Thus the airbag will inflate quickly with little fear of gas leakage despite the configuration that the first end region of the inflator provided with the first mounting means is disposed outside of the airbag. Moreover, a strong pressing by the pressing section will not occur until the first mounting means is fastened to the member of the vehicle. Accordingly, the pressing section will not hinder an insertion work of the body of the inflator into the holding section of the retainer.

Therefore, the airbag device of the invention is capable of inflating the airbag smoothly with little fear of gas leakage via a gap between the inflator and retainer.

In the airbag device of the invention, it is desired that the pressing section is configured to rise gently from the mounting base section in sectional contour as taken along the axis of the body of the inflator. With this configuration, the pressing section will serve as a guide for insertion of the body of the inflator into the holding section of the retainer via the insert opening of the airbag.

BRIEF DESCRIPTION OF DRAWINGS

FIGS. 20 and 21 depict base materials of the airbag of FIG. 16 by plan views;

FIG. 26 is a partial enlarged vertical sectional view of the airbag device of the illustrated embodiment at airbag deployment.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
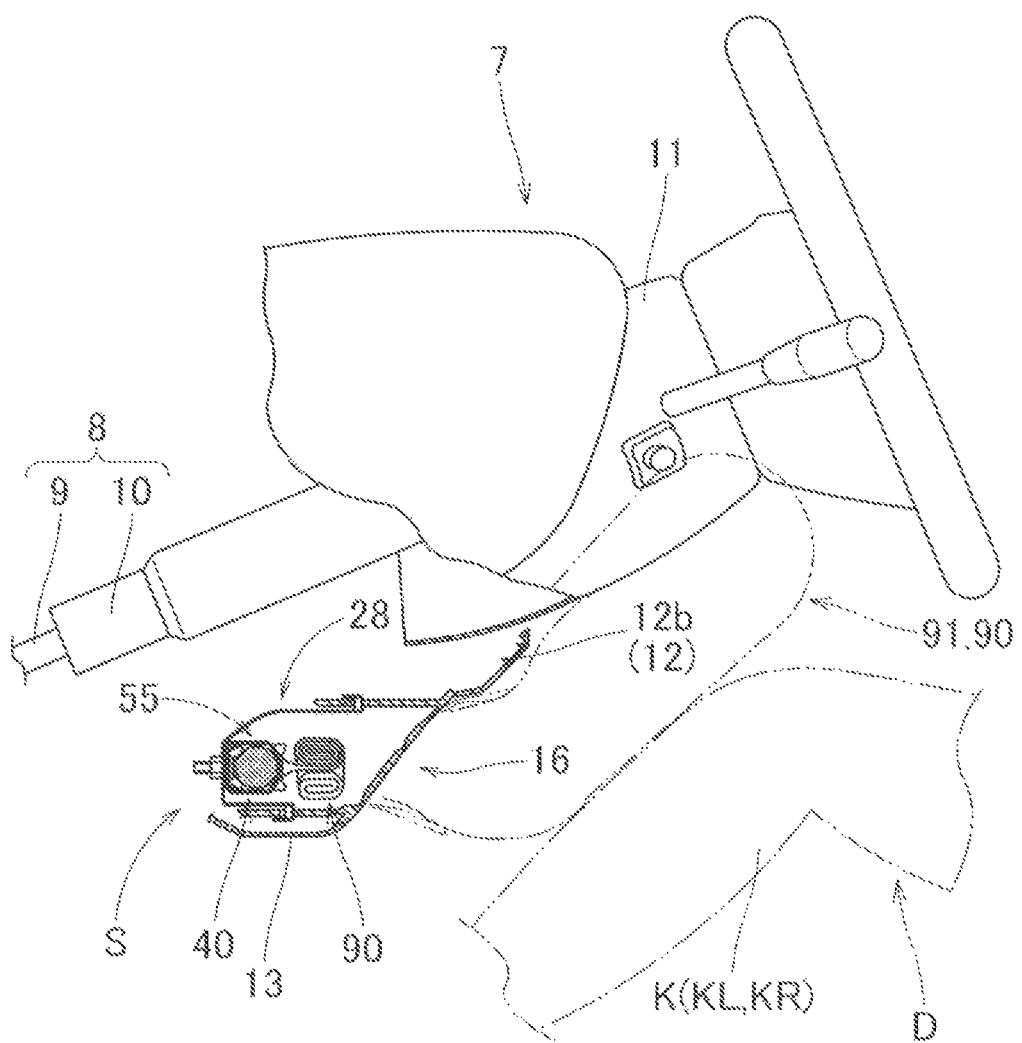
FIG. 1 is a schematic vertical sectional view of a knee-protecting airbag device embodying the invention as mounted on a vehicle and actuated, taken along a front and rear direction of the vehicle.
Figure 4:
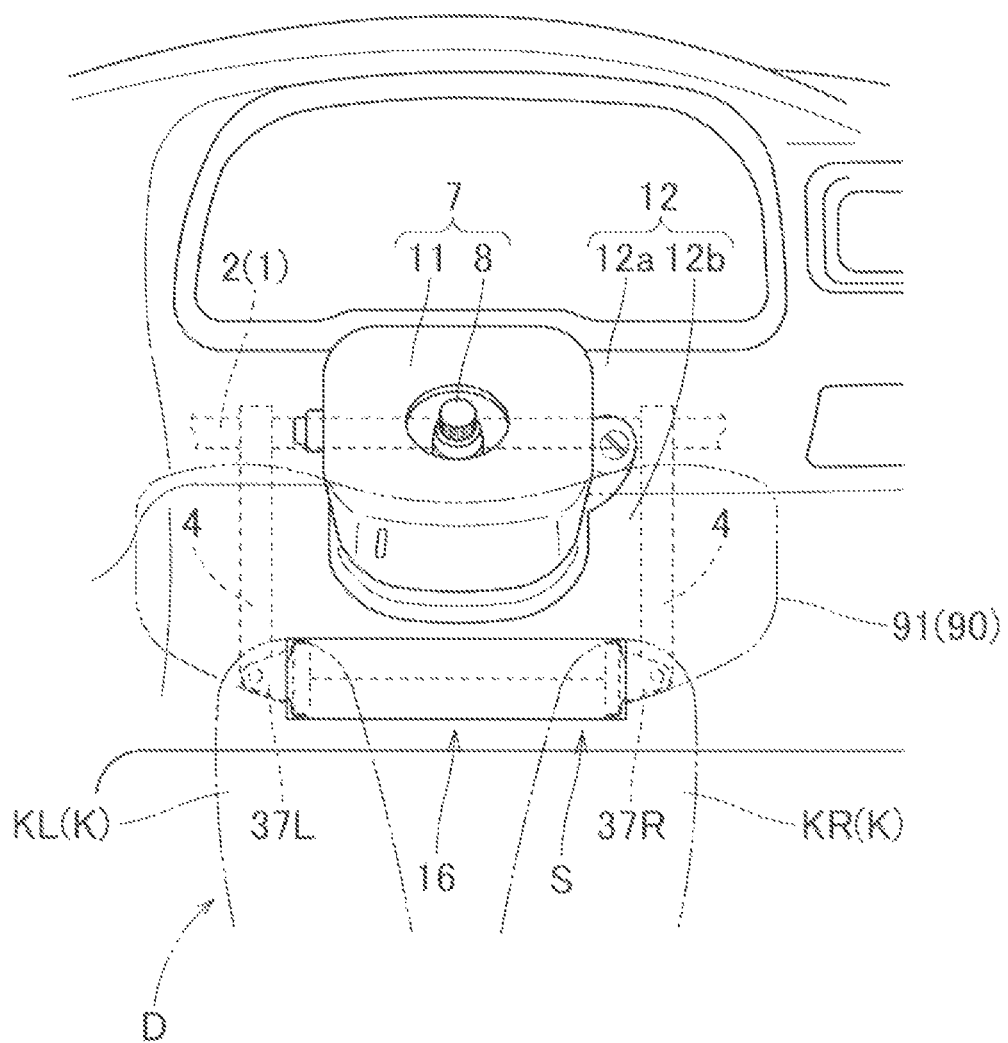
FIG. 4 is a schematic front view of the airbag device of FIG. 1 as actuated, viewed from the rear.

As shown in FIGS. 1 and 4, an airbag device S embodying the invention is mounted beneath a steering column 7, in front of a driver's seat of a vehicle, as a knee-protecting airbag device for protecting knees K (KL and KR) of a driver (as an occupant) D. Unless otherwise specified, up/down, left/right and front/rear directions in this specification are intended to refer to up/down, left/right and front/rear directions of the airbag device S as mounted on the vehicle.

The steering column 7 includes a column body 8 and a column cover 11 which covers an outer circumference of the column body 8. As shown in FIG. 1, the column body 8 includes a main shaft 9 and a column tube 10 covering the main shaft 9.

Figure 2:
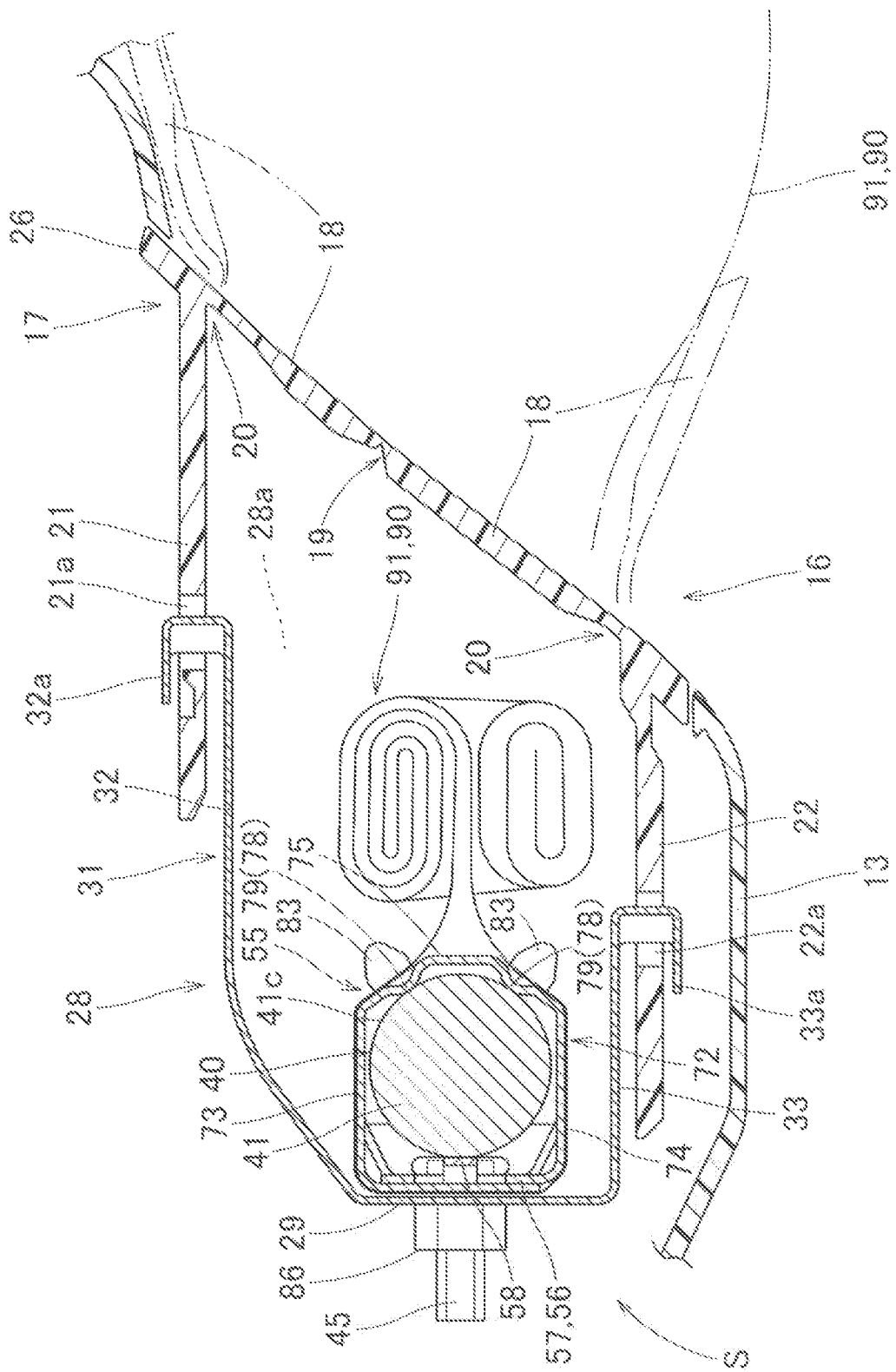
FIG. 2 is a schematic enlarged vertical sectional view of the airbag device of FIG. 1 taken along a front and rear direction of the vehicle.
Figure 3:
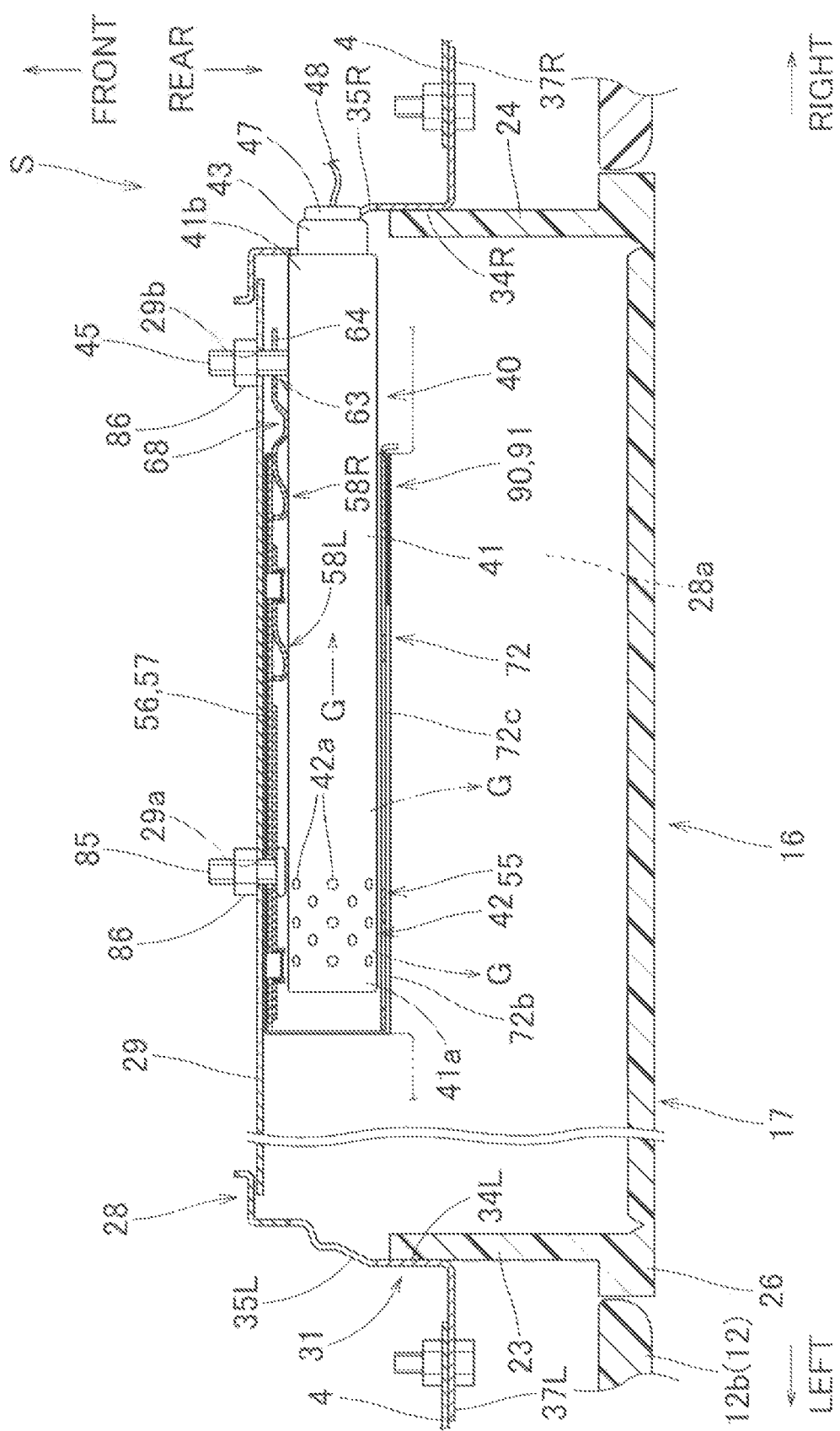
FIG. 3 is a schematic horizontal sectional view of the airbag device of FIG. 1 taken along a left and right direction.

As shown in FIGS. 1 to 3, the airbag device S includes an airbag 90, which is in a folded-up configuration, an inflator 40 for feeding the airbag 90 with an inflation gas, a case (vehicle body member) 28 for housing the airbag 90 and inflator 40, a retainer 55 which is used to mount the airbag 90 and inflator 40 on the case 28, and an airbag cover 16 for covering the rear side of the airbag 90.

The airbag cover 16 is fabricated of thermoplastic elastomer of polyolefin and covers the rear side of the case 28. As shown in FIGS. 1 to 4, the airbag cover 16 is disposed in a lower panel 12b of an instrument panel or dashboard 12 which is composed of an upper panel 12a and lower panel 12b. The airbag cover 16 includes a door-forming region 17 which is disposed in a vicinity of a later-described emergence opening 28a of the case 28, and a peripheral region 26 disposed around the door-forming region 17.

Referring to FIGS. 2 and 3, the door-forming region 17 includes a door 18, mounting regions 21 and 22 which extend forward from upper and lower end portions of the door 18 for joint with the case 28, and side walls 23 and 24 which extend forward from left and right end portions of the door 18. The door 18 is disposed at the rear of the emergence opening 28a and formed into a generally rectangular plate. In the illustrated embodiment, the door 18 is provided with a thinned breakable region 19 which is formed generally into H (FIG. 4, broken lines) as viewed from the rear so as to be openable upward and downward about hinges 20 which are disposed at upper and lower ends of the door 18. Each of the mounting regions 21 and 22 extends forward so as to adjoin a later-described upper wall 32/lower wall 33 of the case 28 on the outside, and is provided, at the front end, with a plurality of rectangular retaining holes 21a/22a for engagement with later-described hooks 32a/33a of the case 28. The retaining holes 21a and 22a are formed along a left and right direction. The side walls 23 and 24 extend forward and adjoin later-described left wall 34L and right wall 34R of the case 28 on the inner side.

The peripheral region 26 of the airbag cover 16 is disposed around the door-forming region 17. As shown in FIGS. 2 and 3, the peripheral region 26 of the illustrated embodiment extends outwardly from the door 18 such that the rear surface is generally flush with the door 18.

Figure 5:
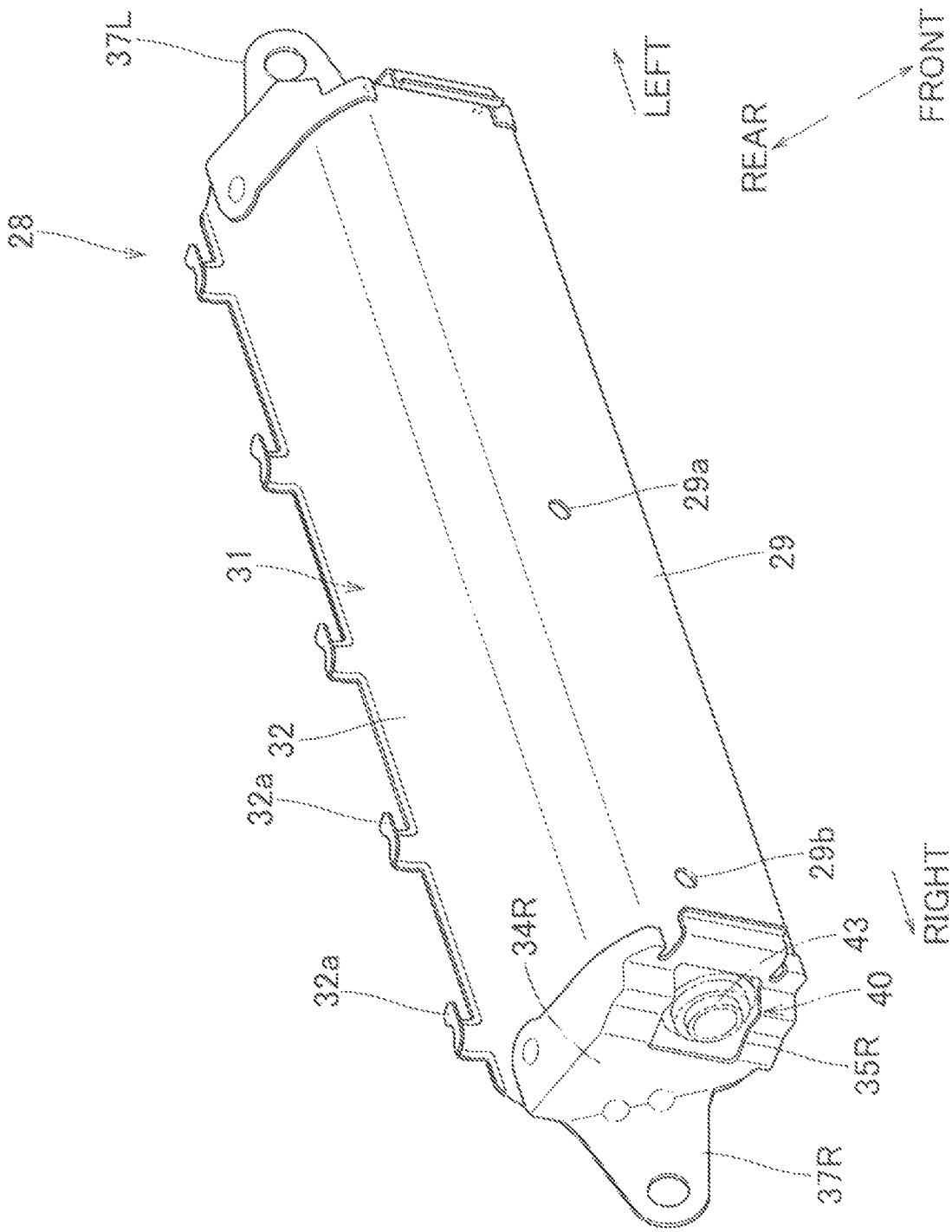
FIG. 5 is a perspective view of a case for use in the airbag device of FIG. 1, viewed from the front.

The case 28 is made of sheet metal. As shown in FIGS. 2, 3 and 5, the case 28 of the illustrated embodiment is formed generally into such a box that includes a generally square bottom wall 29, which is adapted to be installed on the vehicle vertically to face forward, a generally square tubular circumferential wall 31 which extends rearward from the circumferential edge of the bottom wall 29, and an emergence opening 28a via which the airbag 90 emerges out of the case 28 for deployment.

The bottom wall 29 is formed into a generally rectangular plate elongated in a left and rear direction. The bottom wall 29 includes an aperture 29a for receiving a bolt (second mounting means) 85 of the retainer 55 and an aperture 29b for receiving a bolt (first mounting means) 45 of the inflator 40 at spaced-apart positions in a left and right direction. In the illustrated embodiment, the bottom wall 29 of the case 28 serves as a vehicle body member on which the inflator 40 and airbag 90 are mounted.

The circumferential wall 31 includes an upper wall 32 and a lower wall 33 which are opposed in an up and down direction and a left side wall 34L and a right side wall 34R which are opposed in a left and right direction. Each of the upper wall 32 and lower wall 33 is provided with a plurality of hooks 32a/33a for engagement with the peripheries of the retaining holes 21a/22a of the mounting regions 21/22 of the airbag cover 16. Each of the hooks 32a and 33a protrudes outwardly and is so bent that the leading end faces towards the front, thus having a generally L shaped sectional shape. The upper wall 32 and lower wall 33 are provided with a plurality of (five, in the illustrated embodiment hooks) 32a/33a each, lined up in a left and right direction.

In the illustrated embodiment, the left side wall 34L and right side wall 34R are formed into bilaterally symmetric contours. The right side wall 34R, as a representative of both, will be described in detail below.

The right side wall 34R has such a stepped contour that the front region, which adjoins the bottom wall 29, is disposed farther inward (or towards the left) than the rear region, which adjoins the emergence opening 28a. As shown in FIG. 5, the right side wall 34R is provided with a through opening 35R which is rectangular as viewed from the left or right side. The through opening 35R allows a later-described connection port 43 of the inflator 40 as set in the case 28 to be exposed for connection with a connector 47.

As shown in FIGS. 3 and 5, the case 28 of the illustrated embodiment further includes a pair of mounting sections 37L and 37R which extend outwardly in a left and right direction from the rear edges of the left side wall 34L and right side wall 34R. The mounting sections 37L and 37R are used to mount the case 28 on the vehicle body structure 1. The mounting sections 37L and 37R are jointed to brackets 4 extending from the dashboard reinforcement 2, part of the vehicle body 1, at the front side of the lower panel 12b of the dashboard 12, as shown in FIGS. 3 and 4.

As shown in FIG. 3, the inflator 40 of the illustrated embodiment includes a generally cylindrical body 41 and a bolt (i.e. first mounting means) 45 which protrudes out of a right end (root end or first end) 41b region of the body 41. The inflator body 41 is adapted to be disposed along a left and right direction of the vehicle, and includes a gas release section 42 at the left end 41a region (i.e. at the leading end). As shown in FIG. 3, the gas release section 42 includes numerous gas discharge ports 42a which are arranged in a radially interspaced fashion, in more than one rows. At the right end (root end) 41b of the inflator body 41, there is provided a connection port 43 for joint with a connector 47 to which lead wires 48 are connected for feeding an actuating signal, as shown in FIG. 3.

The bolt (i.e. first mounting means) 45 protrudes out of the right end 41b region of the inflator body 41 generally orthogonally to the axis of the inflator body 41. More specifically, the bolt 45 is disposed at an approximately one-fifth position of the length of the inflator body 41 from the end face of the right end 41b.

Figure 6:
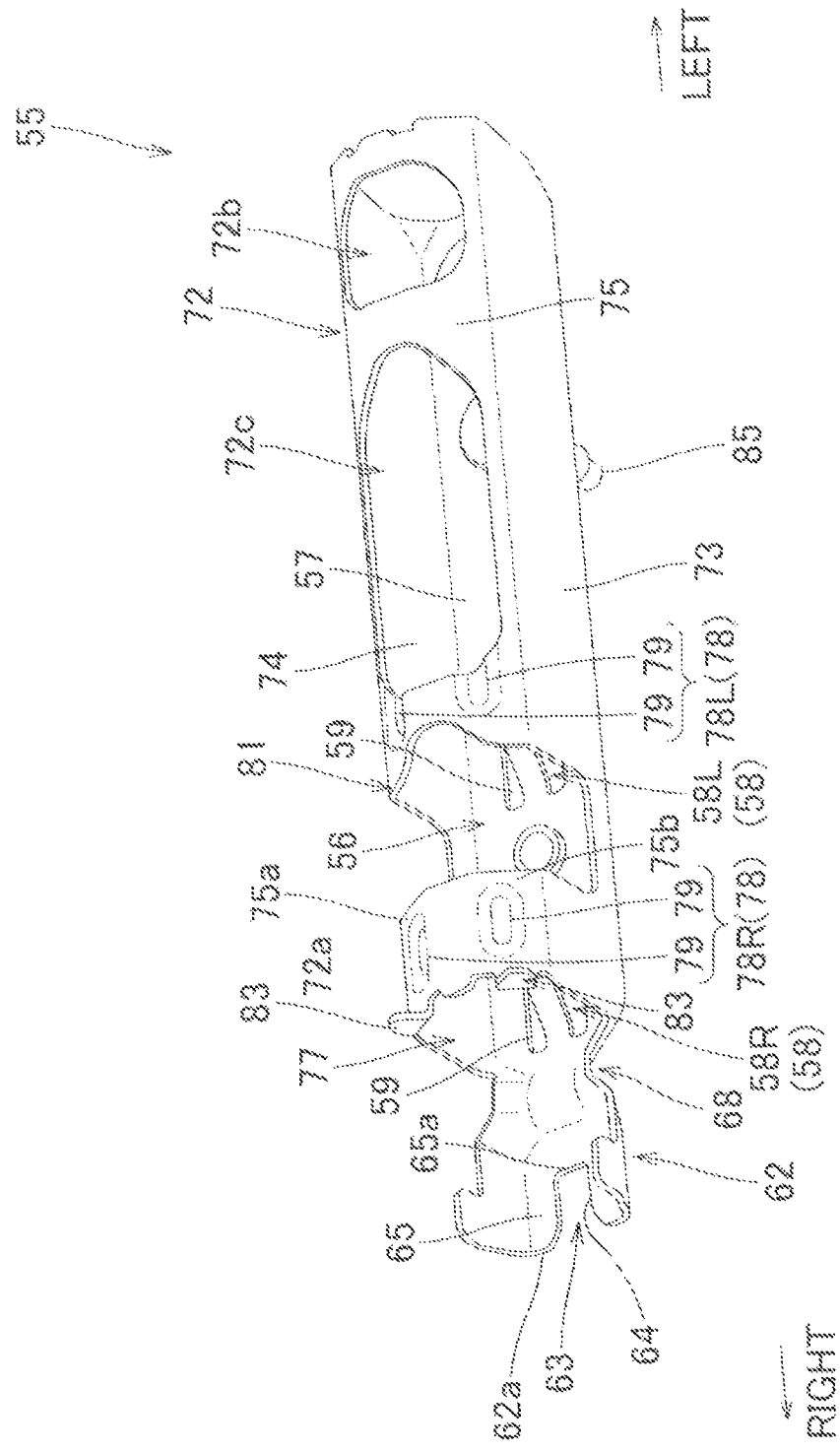
FIG. 6 is a perspective view of a retainer for use in the airbag device of FIG. 1, viewed from the rear.
Figure 7:
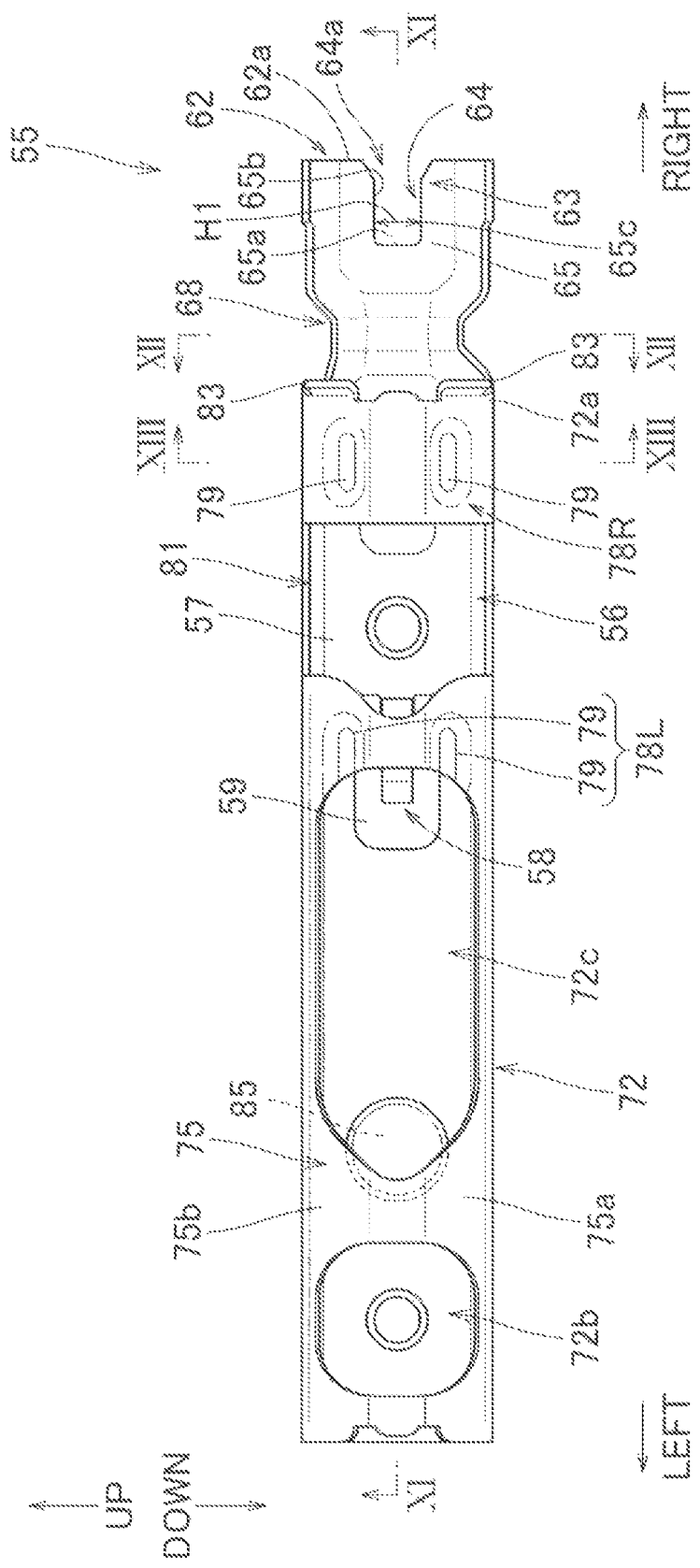
FIG. 7 is a front view of the retainer of FIG. 6 viewed from the rear.
Figure 8:
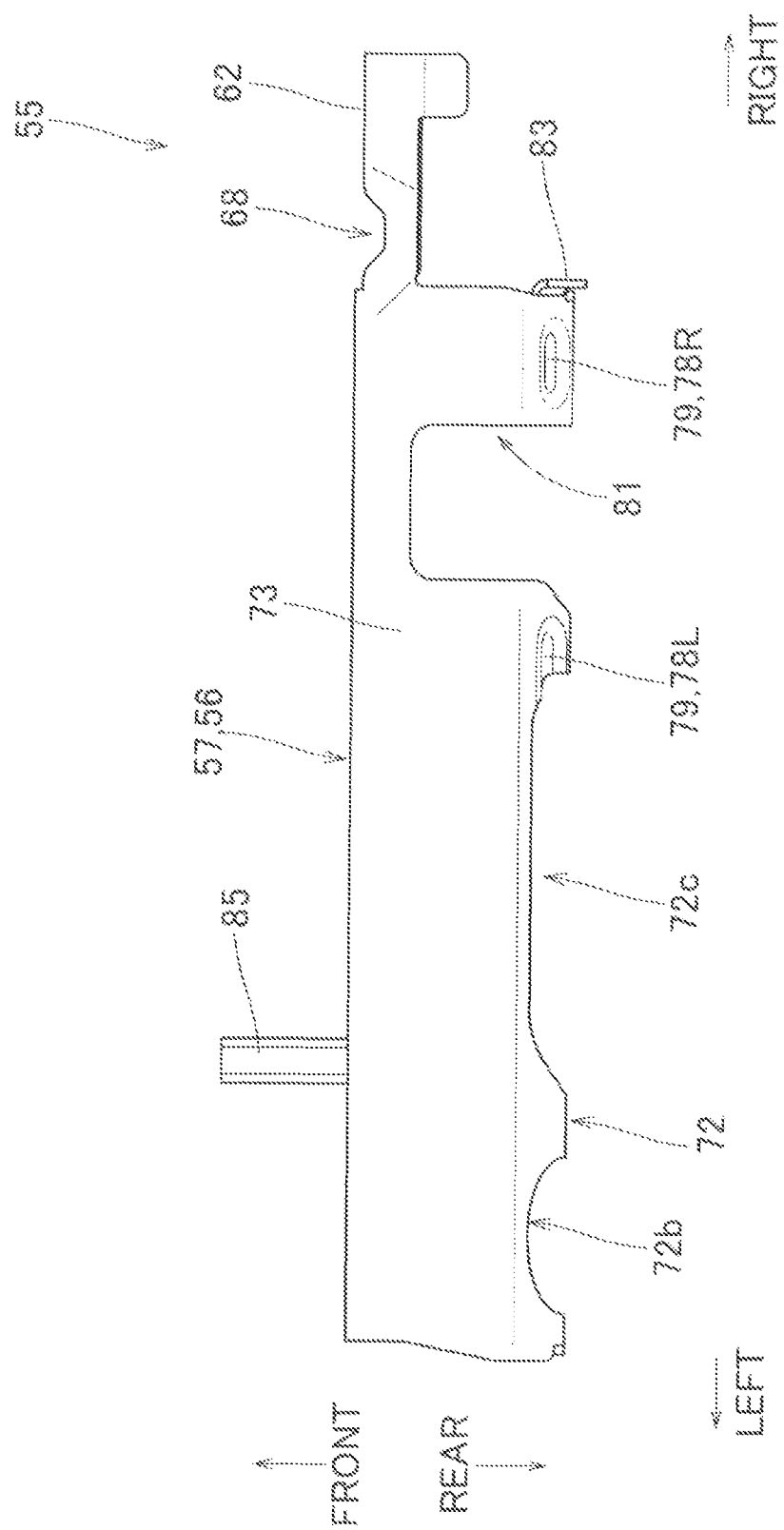
FIG. 8 is a plan view of the retainer of FIG. 6.

Referring to FIGS. 6 to 8, the retainer 55 includes a mounting base section 56 which is adapted to be disposed generally along the bottom wall 29 of the case 28, a holding section 72 which extends from the mounting base section 56 and covers the outer circumference of the inflator body 41, and a bolt (i.e. second mounting means) 85 which protrudes out of the mounting base section 56. The mounting base section 56 and holding section 72 are integrally formed out of a sheet metal.

Figure 11:
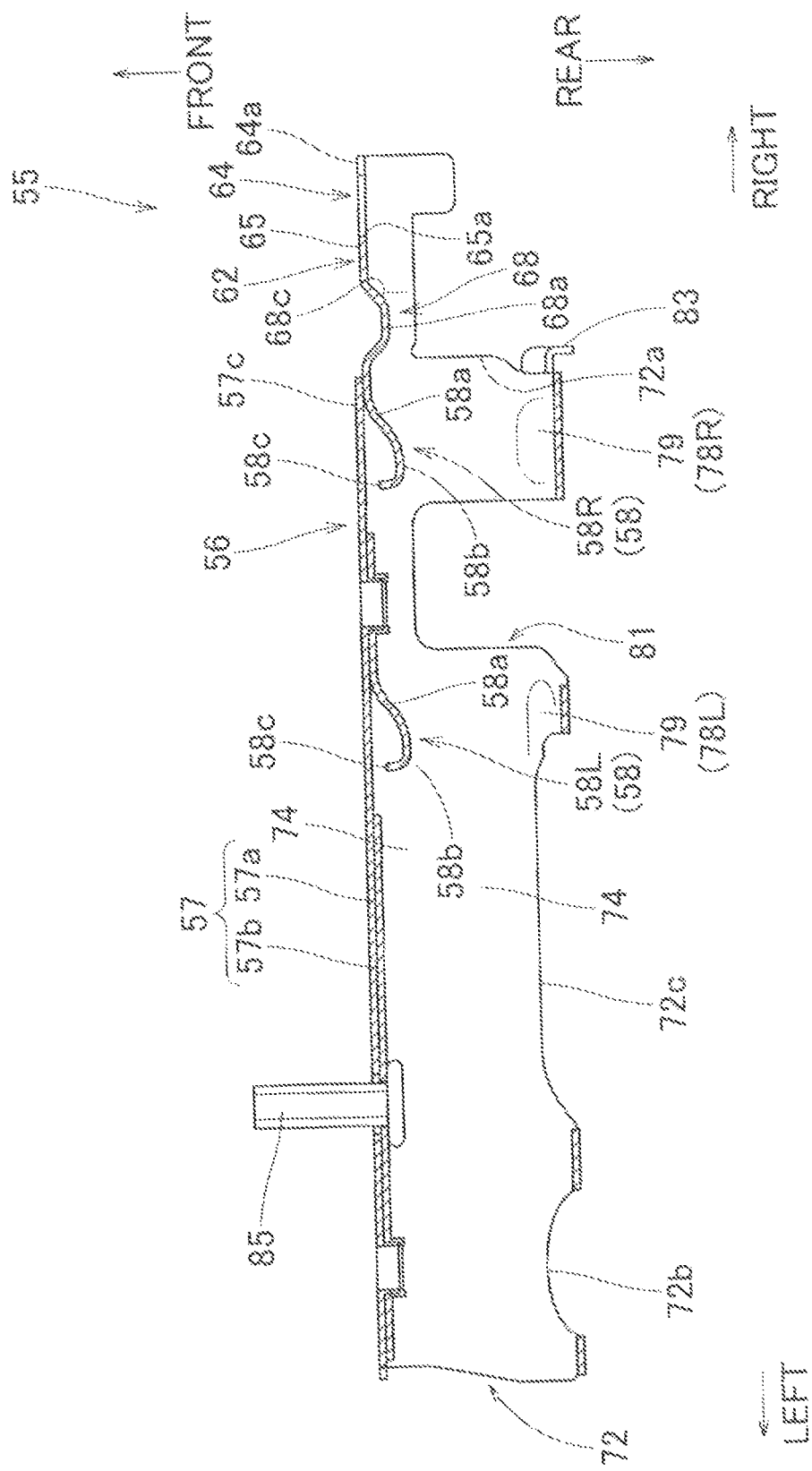
FIG. 11 is a sectional view of the retainer of FIG. 6 taken along line XI-XI of FIG. 7.
Figure 13:
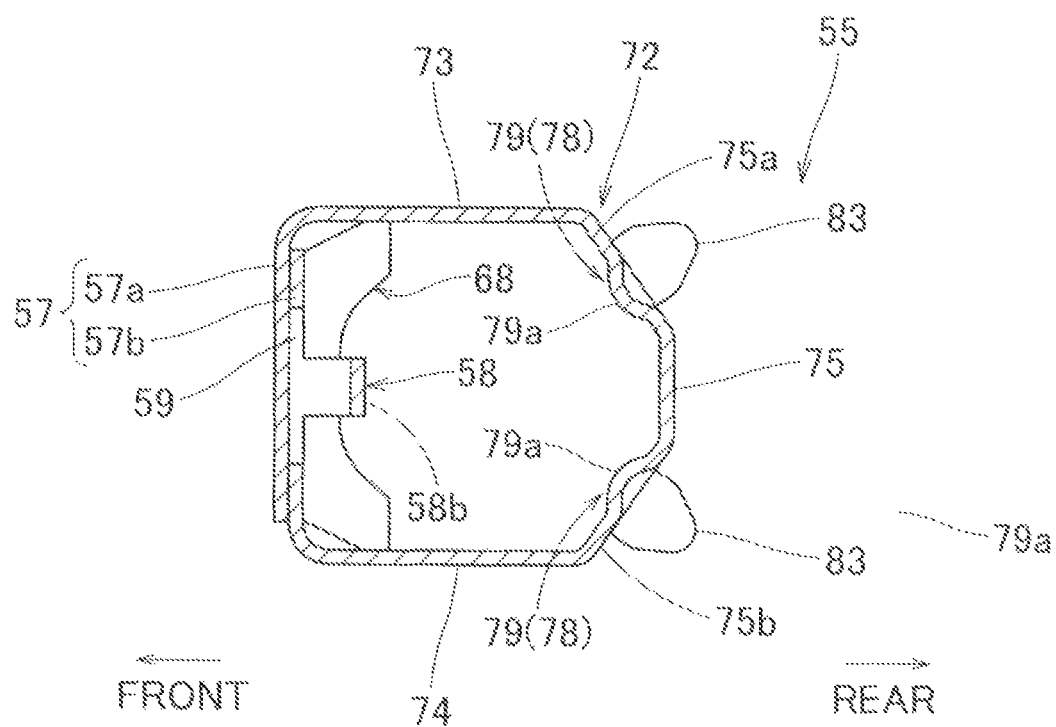
FIG. 13 is an enlarged sectional view of the retainer of FIG. 6 taken along line XIII-XIII of FIG. 7.

As shown in FIGS. 2 and 3, the mounting base section 56 is formed into a flat plate elongated in a left and right direction. As shown in FIG. 11, the mounting base section 56 includes a main body 57 which is continuous with the holding section 72, a storing dent section 63 for receiving the bolt 45 of the inflator body 41, and a pressing section 68 which is disposed between the main body 57 and storing dent section 63. The storing dent section 63 of the illustrated embodiment is formed at the right end 57c of the main body 57. As described above, the mounting base section 56 and holding section 72 are integrally formed out of a sheet metal having a predetermined contour. The sheet metal is formed into a predetermined shape by pressing or the like, and then the opposite edges of the sheet metal are lapped and jointed by suitable clinching technique at the main body 57. Thus the main body 57 of the mounting base section 56 has a double-wall structure of an outer region 57a and an inner region 57b, as shown in FIGS. 11 and 13.

Figure 10:
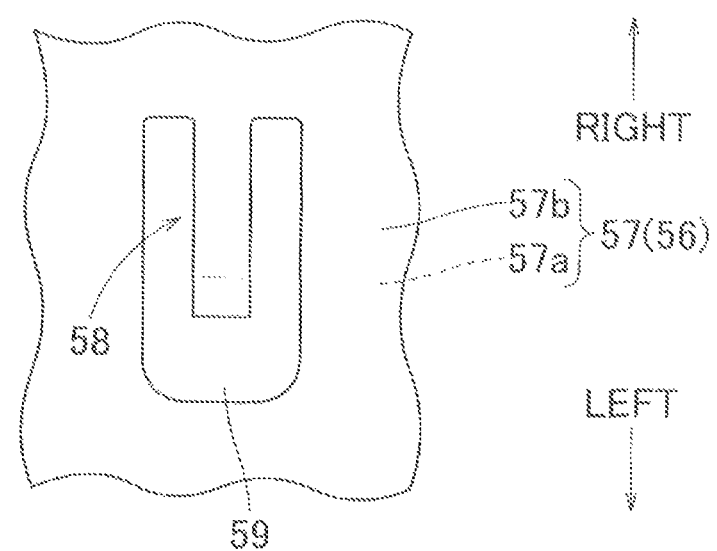
FIG. 10 is a partial enlarged view of an elastically deformable support region of the retainer of FIG. 6.
Figure 14:
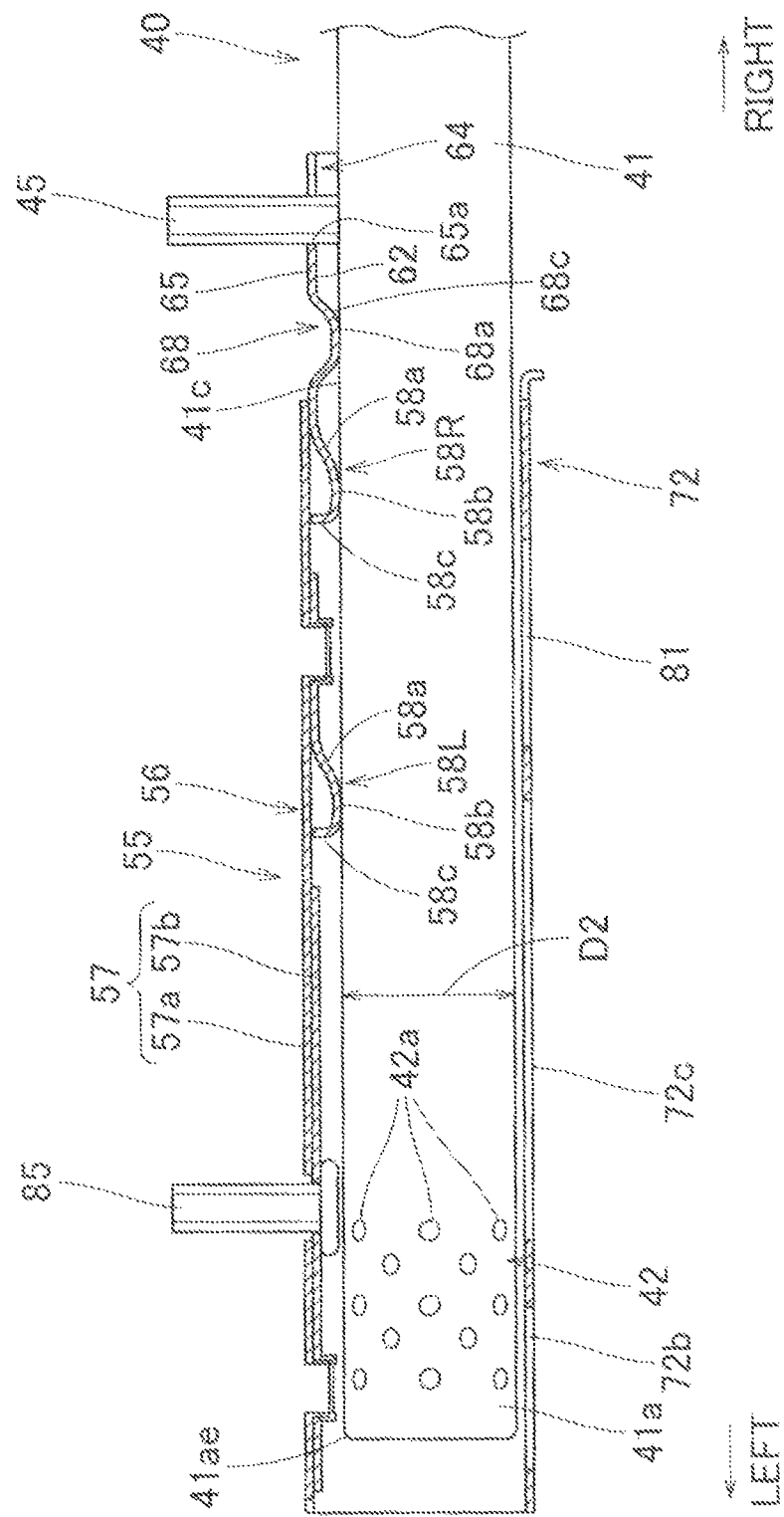
FIG. 14 is a cross sectional view of the retainer as mounted on an inflator.

Referring to FIGS. 10 and 11, the main body 57 of the mounting base section 56 includes an elastically deformable support region 58 which is to elastically deform when the inflator body 41 is inserted into the holding section 72 and abut against the outer circumference 41c of the inflator body 41 for supporting the inflator body 41. The elastically deformable support region 58 is formed by cutting and raising a portion of the inner region 57b of the main body 57. The elastically deformable support region 58 is formed into a band extending generally along a left and right direction. As shown in FIGS. 10 and 11, the right end (or root end) of the elastically deformable support region 58, which is closer to a later-described insert opening 77, is continuous with the inner region 57b of the main body 57, while the leading end 58c is separated from the main body 57. More specifically, as shown in FIGS. 11 and 13, the elastically deformable support region 58 extends obliquely inwardly (i.e. towards the rear, as mounted on board) towards the left, and is bent forward at the leading end 58c, thus having a J-like curved sectional shape. That is, the elastically deformable support region 58 includes a sloping region 58a, which is composed of the root region, the leading end region 58c and a support body 58b which is disposed between the sloping region 58a and the leading end region 58c and curved generally in an arcuate shape and protrudes inwardly. Because of the cut and raised configuration of the elastically deformable support region 58, an opening 59 is formed around the elastically deformable support region 58 in the inner region 57b. However, the opening 59 is closed off by the outer region 57a of the main body 57 of the mounting base section 56, as shown in FIGS. 11 and 13. The protruding amount of the support body 58b of elastically deformable support region 58 out of the inner region 57b is such as to make the sloping region 58a bend or elastically deform and make the support body 58b abut against the outer circumference 41c of the inflator body 41 when the inflator body 41 is set in the holding section 72. The sloping region 58a of the elastically deformable support region 58 is configured to protrude obliquely inwardly towards the left (i.e. towards a direction away from the insert opening 77) so as to assist with smooth insertion of the inflator body 41 into the holding section 72 via the insert opening 77. Once the inflator body 41 is set in the holding section 72, the elastically deformable support region 58 stays in a deformed state and supports the outer circumference 41c of the inflator body 41 with the support body 58b as shown in FIG. 14. The leading end 58c of the elastically deformable support region 58 is located at a distance from the outer region 57a of the main body 57, as shown in FIG. 11, for providing an allowance for elastic deformation of the support region 58 (FIG. 14).

The elastically deformable support region 58 is provided, in cooperation with a later-described butt region 78, to hold the inflator body 41 as inserted into the retainer 55. As shown in FIGS. 7, 11 and 13, the support region 58 of the illustrated embodiment is disposed generally at the same position in a left and right direction as the butt region 78 so as to be opposed to the butt region 78 in a front and rear direction. Moreover, the retainer 55 of the illustrated embodiment includes two such elastically deformable support regions 58L and 58R. Both of the elastically deformable support regions 58L and 58R are disposed to the right side of the center in a left and right direction of the main body 57, interspatially in a left and right direction, as shown in FIGS. 7 and 11. More particularly, the support region 58R, which is located farther to the right side, is disposed in a vicinity of the right end 72a of the holding section 72 (i.e. in a vicinity of the insert opening 77), in other words, in a vicinity of and on the left of the pressing section 68.

The bolt 85, which serves as the second mounting means, is disposed in an area to the left of the center in a left and right direction of the main body 57, i.e. in a first end region or in an area distant from the elastically deformable support regions 58 in a left and right direction. More particularly, the bolt 85 is located at a quarter position from the left end of the main body 57. The bolt 85 protrudes out of the main body 57 generally perpendicularly to the axis of the inflator body 41, in other words, generally perpendicularly to the inflator body 41.

As shown in FIGS. 7 and 11, the storing dent section 63 for receiving the bolt 45 of the inflator 40 is disposed in a vicinity of the right end or second end 57c of the main body 57. Specifically, the storing dent section 63 is disposed in an extended region 62 which continues from the main body 57. The storing dent section 63 includes a dent body 64 which is indented from the right edge 62a of the extended region 62, and a peripheral region 65 which forms the periphery of the dent body 64. The extended region 62 is formed into a flat plate extending generally along the bottom wall 29 of the case 28. That is, the extended region 62 extends generally along the main body 57 of the mounting base section 56. The dent body 64 has its opening 64a at the right edge 62a of the extended region 62 and extends in a left and right direction as shown in FIG. 7, and receives the bolt 45 of the inflator 40 when the inflator body 41 is set in the holding section 72. The width H1 (FIG. 7) in a front and rear direction of the dent body 64 is slightly greater than a diameter D1 (FIG. 24) of the bolt 45. In the illustrated embodiment, the dent body 64 is so formed that the right end region enlarges towards the opening 64a for easy insertion of the bolt 45, as shown in FIG. 7. If the bolt 45 of the inflator body 41 is inserted into the dent body 64 via the opening 64a at the setting of the inflator body 41 inside the holding section 72 of the retainer 55, the peripheral region 65 (specifically, an upper peripheral region 65b and a lower peripheral region 65c, see FIG. 7) helps set the bolt 45 in an adequate posture to protrude generally in the same direction as the bolt 85 of the retainer 55, as shown in FIG. 14. And if the bolt 45 is inserted into the dent body 64 until abuts against the left edge 65a of the peripheral region 65, the bolt 45 is positioned with an adequate distance from the bolt 85 of the retainer 55 such that the bolt 45 and the bolt 85 smoothly go into the apertures 29a and 29b formed on the bottom wall 29 of the case 28 at one time.

Figure 9:
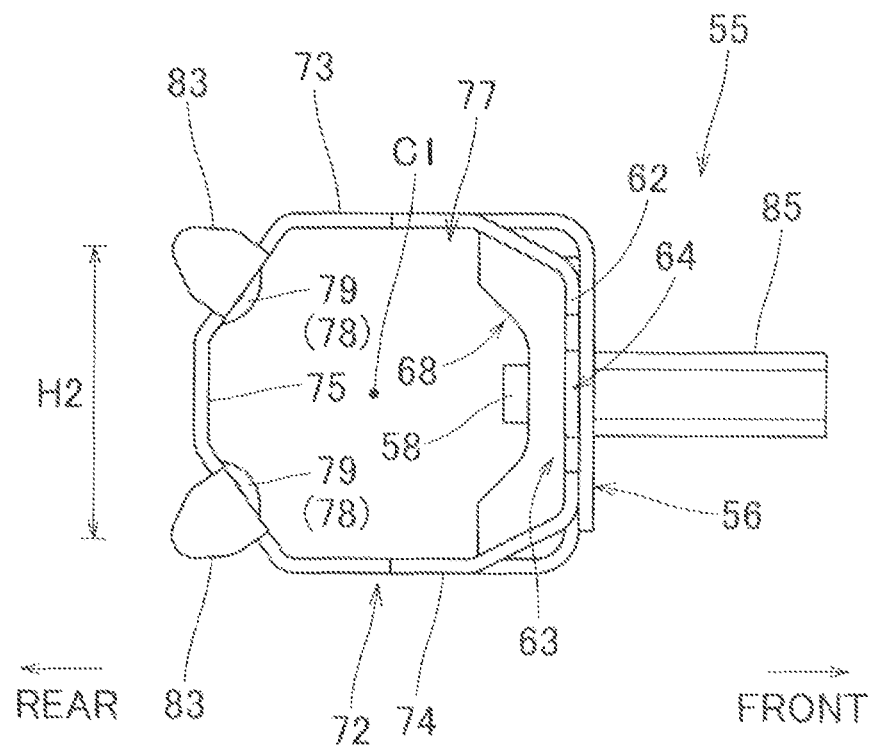
FIG. 9 is an enlarged side view of the retainer of FIG. 6 viewed from the right side.
Figure 12:
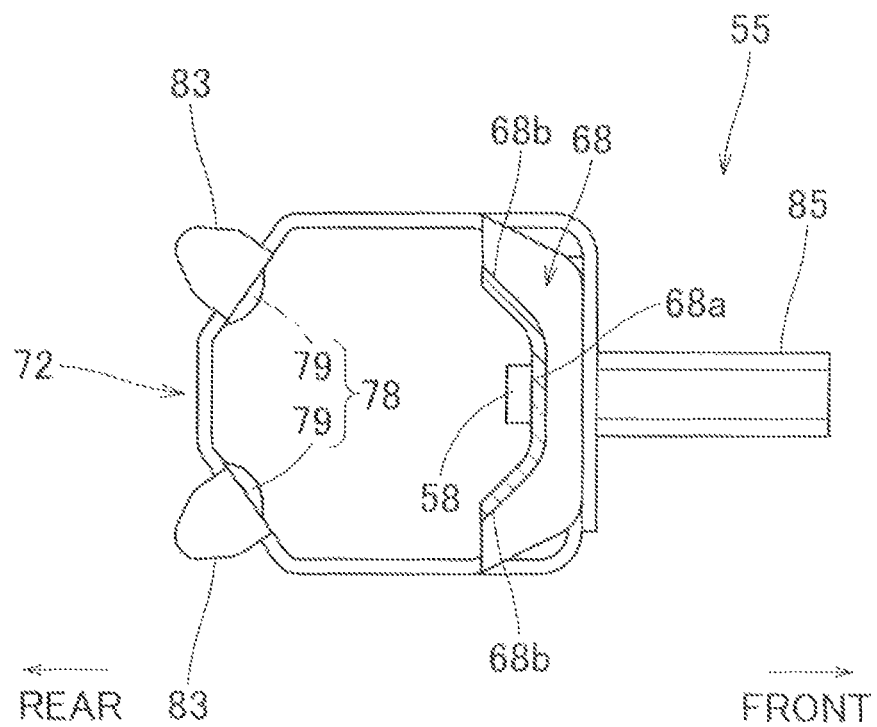
FIG. 12 is an enlarged sectional view of the retainer of FIG. 6 taken along line XII-XII of FIG. 7.
Figure 15:
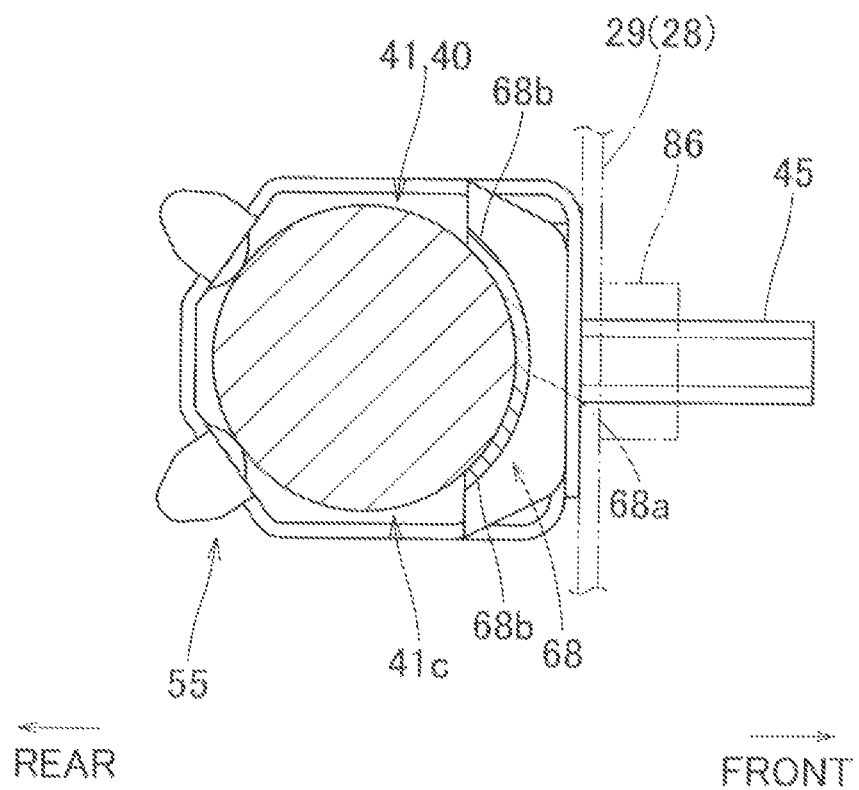
FIG. 15 is a sectional view of the retainer as assembled with the inflator, taken at the location of a pressing section.
Figure 24:
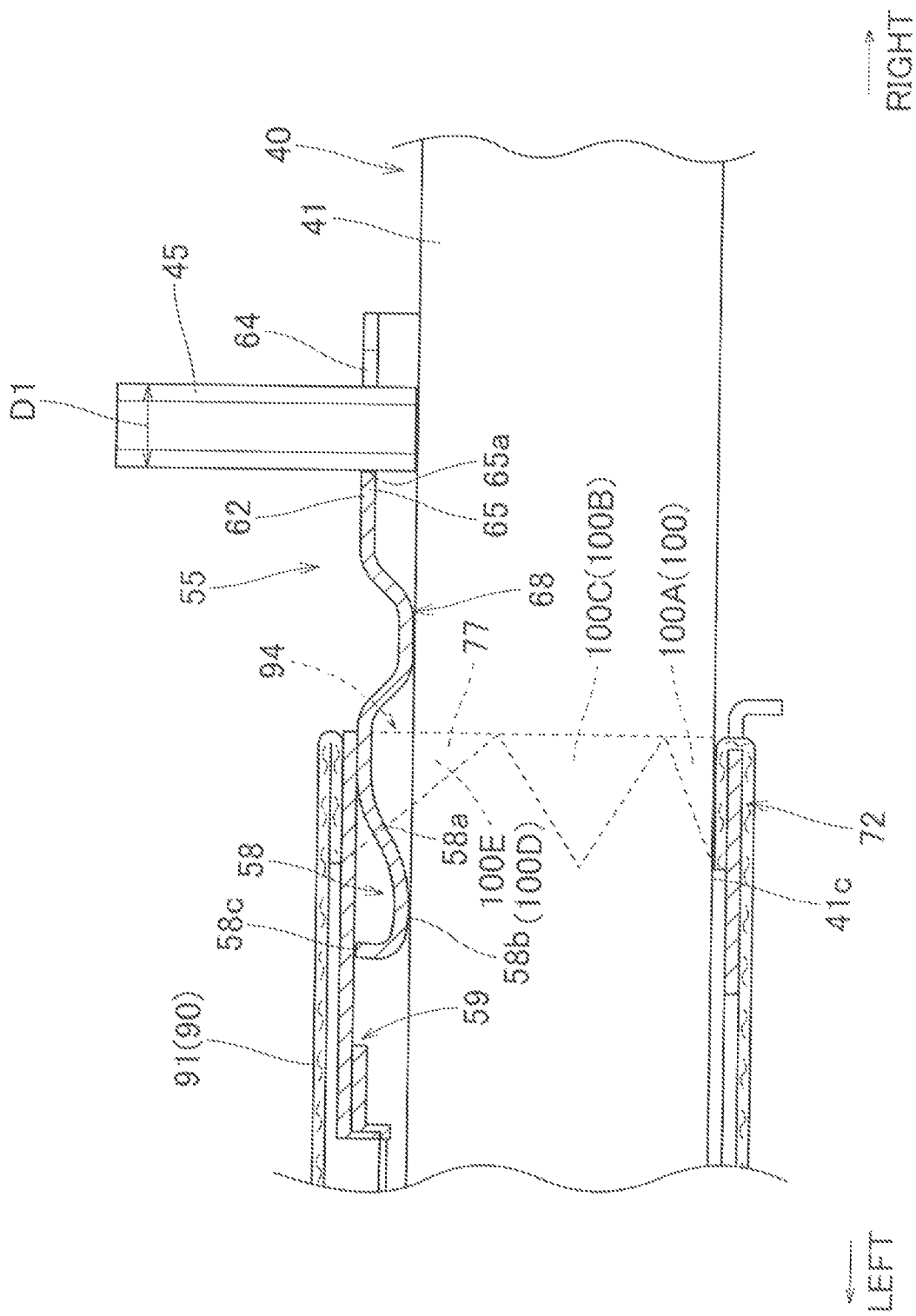
FIG. 24 is a schematic sectional view showing the inflator as inserted into the retainer via the insert opening of the airbag.

The pressing section 68 is disposed between the main body 57 and the extended region 62. Specifically, the pressing section 68 is disposed proximate to the storing dent section 63, between the bolt 85 and the storing dent section 63. The pressing section 68 is designed to be pressed onto the outer circumference of the body 41 of the inflator 40 when the bolt 45 of the inflator 40 is fastened to the bottom wall (vehicle body member) 29 of the case 28. More particularly, the pressing section 68 is designed to be brought into contact with an extensive area in a circumferential direction of a front area of the outer circumference 41c of the inflator body 41 as mounted on board. As viewed from the left or right as mounted on board, the pressing section 68 extends upward and downward from the bolt 45, as shown in FIGS. 9 and 12. More particularly, as viewed from the left or right, the pressing section 68 has such a curved shape as to be capable of contacting a generally quarter circumferential area of the circumference 41c of the inflator body 41. That is, the pressing section 68, specifically, the leading end region 68a of the pressing section 68, is formed into such a generally quarter annular shape as to fit the outer circumference 41a of the inflator body 41. Moreover, as shown in FIG. 11, as seen in a sectional view taken along the axial direction of the inflator body 41 (or holding section 72), the pressing section 68 protrudes inward and has a rising plane (or a sloping plane) 68c that rises out of the mounting base section 56 gently. As shown in FIG. 11, the protruding amount of the pressing section 68 out of the mounting base section 56 is smaller than that of the support region 58 as has not yet been assembled with the inflator 40. When the inflator body 41 is set in the retainer 55 and the elastically deformable support regions 58 are deformed, the leading end region 68a of the pressing section 68 is brought into contact with the outer circumference 41c of the inflator body 40, as shown in FIG. 14. To describe more specifically, as shown in FIG. 12, the sectional contour in a front and rear direction of the leading end region 68a of the pressing section 68 is not a generally circular arc, although gently curving in a front and rear direction. However, when the inflator 40 as assembled with the retainer 55 is housed in the case 28 and the bolt 45 of the inflator 40 is fastened with a nut 86, the pressing section 68 is pressed by the inflator body 41 and deformed such that upper and lower edges 68b of the leading end region 68a are flattened as shown in FIG. 15. The leading end region 68a of the pressing section 68 is then brought into contact with the outer circumference 41c of the inflator body 40 as a whole while the inflator 40 is housed inside the case 28. That is, while the airbag device S is mounted on the vehicle, a generally whole area in the circumferential direction of the leading end region 68a of the pressing section 68 stays pressed onto the front area (i.e. the area facing towards the mounting base section 56) of the outer circumference 41c of the inflator body 41. Further, the pressing section 68 of the illustrated embodiment is located adjacent and on the right side of the holding section 72. In other words, the pressing section 68 is not covered with the holding section 72. That is, as shown in FIG. 24, when the retainer 55 is stored inside the airbag 90, the pressing section 68 is disposed outside of the airbag 90, at a vicinity of the insert opening 94 of the airbag 90.

The holding section 72 receives the body 41 of the inflator 40 therein in cooperation with the main body 57 of the mounting base section 56. The holding section 72 forms a generally square tubular contour elongated in a left and right direction together with the main body 57 of the mounting base section 56, and are open at both left and right ends. The holding section 72 includes an upper wall 73 which extends rearward from a vicinity of the upper edge of the mounting base section 56 and covers the upper side of the inflator body 41, a lower wall 74 which extends rearward from a vicinity of the lower edge of the mounting base section 56 and covers the lower side of the inflator body 41, and a rear wall 75 which connects the rear ends of the upper wall 73 and lower wall 74 and covers the rear side of the inflator body 41. More particularly, the rear wall 75 includes, at the upper area and lower area, an upper sloping region 75a and a lower sloping region 75b which are formed in such a manner as to chamfer the corners of the holding section 72. The holding section 72 further includes, in the left area, an outlet opening 72b and an outlet opening 72c for releasing an inflation gas emitted out of the gas release section 42 of the inflator 40 into the airbag 90. Each of the outlet openings 72b and 72c is formed by cutting out a portion of the holding section 72 which covers the rear side of the gas release section 42 of the inflator 40 (i.e. a portion of the rear wall 75). An opening formed at the right end 72a of the holding section 72 serves as an insert opening 77 via which the inflator body 41 is inserted from the gas release section 42.

The rear wall 75 includes a butt region 78 which abuts against the outer circumference 41c of the inflator body 41 as set in the holding section 72. The rear wall 75 of the illustrated embodiment includes two such butt regions 78L and 78R, which are disposed interspatially in a left and right direction. As shown in FIGS. 6 and 11, each of the butt regions 78L and 78R is disposed opposite to the support region 58L/58R in a front and rear direction. More specifically, as shown in a sectional view taken along a front and rear direction in FIG. 13, each of the butt regions 78L and 78R includes two supporting projections 79 which are disposed spaced-apart in a circumferential direction (in an up and down direction). Each of the supporting projections 79 is formed by denting each of the upper sloping region 75a and lower sloping region 75b of the rear wall 75 inwardly (i.e. towards the inflator body 41 or towards the front). The leading end 79a region of each of the supporting projections 79 is formed into a generally circular arc, and butts the outer circumference 41c of the inflator body 41.

With the configuration as described above, once the inflator body 41 has been set in the holding section 72, the support body 58b of the elastically deformable support region 58 and the leading ends of the supporting projections 79 of the butt region 78 support the outer circumference 41c of the inflator body 41 at three, spaced-apart points around the axis of the inflator 40 as shown in FIG. 2, and such a support occurs at two spaced-apart positions in a left and right direction of the retainer 55. This configuration will help match the central axis of the inflator body 41 and that of the holding section 72 when the inflator body 41 is set inside the holding section 72, and keep them matched while the retainer 55 holds the inflator body 41. Further, since each of the elastically deformable support regions 58L and 58R supports the inflator body 41 in an elastically deformed state, the inflator body 41 is prevented from moving in the axial direction. Accordingly, merely by setting the inflator body 41 in the holding section 72 via the insert opening 77 and pushing the bolt 45 into the dent body 64 of the storing dent section 63 until the bolt 45 abuts against the left edge 65a of the peripheral region 65, the outer circumference 41c of the inflator body 41 will be supported by the support bodies 58b of the elastically deformable support regions 58L and 58R and the leading end 79a regions of the supporting projections 79, and the inflator body 41 will be positioned with respect to the holding section 72. Moreover, in the illustrated embodiment, the dent body 64 of the storing dent section 63 is formed into a mere indentation whose right end is left open, and the bolt 45 is merely inserted into the dent body 64. However, once the inflator body 41 is positioned with respect to the holding section 72, the bolt 45 will be prevented from moving inside the dent body 64, and positioned with respect to the bolt 85 of the retainer 55 with predetermined orientation and with a predetermined distance from the bolt 85. Thus the bolts 45 and 85 will smoothly go into the apertures 29a and 29b of the bottom wall 29 of the case 28 at one time.

The holding section 72 further includes, between the butt regions 78L and 78R, a crimp opening 81 at which a later-described flap member 110 of the airbag 90 is directly pressed against the outer circumference 41c of the inflator body 41 to seal a later-described insert opening 94 of the airbag 90 (FIGS. 25 and 26) at airbag deployment. More particularly, as shown in FIGS. 6 to 8 and 11, the crimp opening 81 is formed in such a manner that a continuous portion on the upper wall 73, rear wall 75 and lower wall 74 of the holding section 72 is cut out. The width in a left and right direction of the crimp opening 81 is such as to allow the flap member 100, whose left edge 110c is a free end, to be pressed directly against the outer circumference 41c of the inflator body 41 when a pressure of an inflation gas G is applied thereto at airbag deployment.

At the right end 72a of the holding section 72 (or in the periphery of the insert opening 77), there are formed two retaining pawls 83 which are to protrude out of a later-described insert opening 94 of the airbag 90 when the retainer 55 is stored inside the airbag 90 and the airbag 90 is folded up. The retaining pawls 83 are disposed spaced-apart in a circumferential direction of the holding section 72. In the illustrated embodiment, as shown in FIG. 9, each of the retaining pawls 83 protrudes rearward out of the edge of each of the upper sloping region 75a and lower sloping region 75b. That is, the retaining pawls 83 are disposed at the rear area of the holding section 72, apart from the mounting base section 56. More particularly, the retaining pawls 83 are located at two circumferential positions of the inflator 40 (or of the holding section 72) which are distant generally by a diameter of the inflator body 41. That is, the clearance H2 between the retaining pawls 83 (FIG. 9) generally coincides with the diameter D2 of the inflator body 41 (FIG. 14). When the airbag device S of the illustrated embodiment is assembled, the retainer 55 is stored inside the airbag 90 first and the airbag 90 is folded up. After that, the body 41 of the inflator 40 is inserted into the airbag 90 via the insert opening 94 such that the inflator 40 is set inside the retainer 55 via the insert opening 77. For a smooth insertion of the inflator body 41 into the retainer 55, the retaining pawls 83 assist with alignment of the positions of the insert opening 94 of the airbag 90 and the insert opening 77 of the retainer 55 (in other words, alignment of an insertion center C1 of the insert opening 77 of the retainer 55 and an insertion center C2 of the insert opening 94 of the airbag 90, see FIGS. 9, 18 and 22).

In the airbag device S of the illustrated embodiment, the retainer 55 and inflator body 41 are preliminarily put inside the airbag 90, and the airbag 90 is stored in the case 28 as it is such that the bolt 85 of the retainer 55 and the bolt 45 of the inflator 40 protrude out of the bottom wall 29 of the case 28. Then the bolts 45 and 85 are fastened with nuts 86, such that the inflator 40 and airbag 90 are mounted on the bottom wall (i.e. the vehicle body member) 29 of the case 28. When the bolts 45 and 85 are fastened with the nuts 86, the pressing section 68 of the retainer 55 supports the inflator body 41 at a vicinity of the bolt 45, thus the inflator body 41 is securely held by the retainer 55 such that the central axis is fixed with respect to the holding section 72 without inclination (i.e. such that the central axis does not slip in a perpendicular direction).

Figure 16:
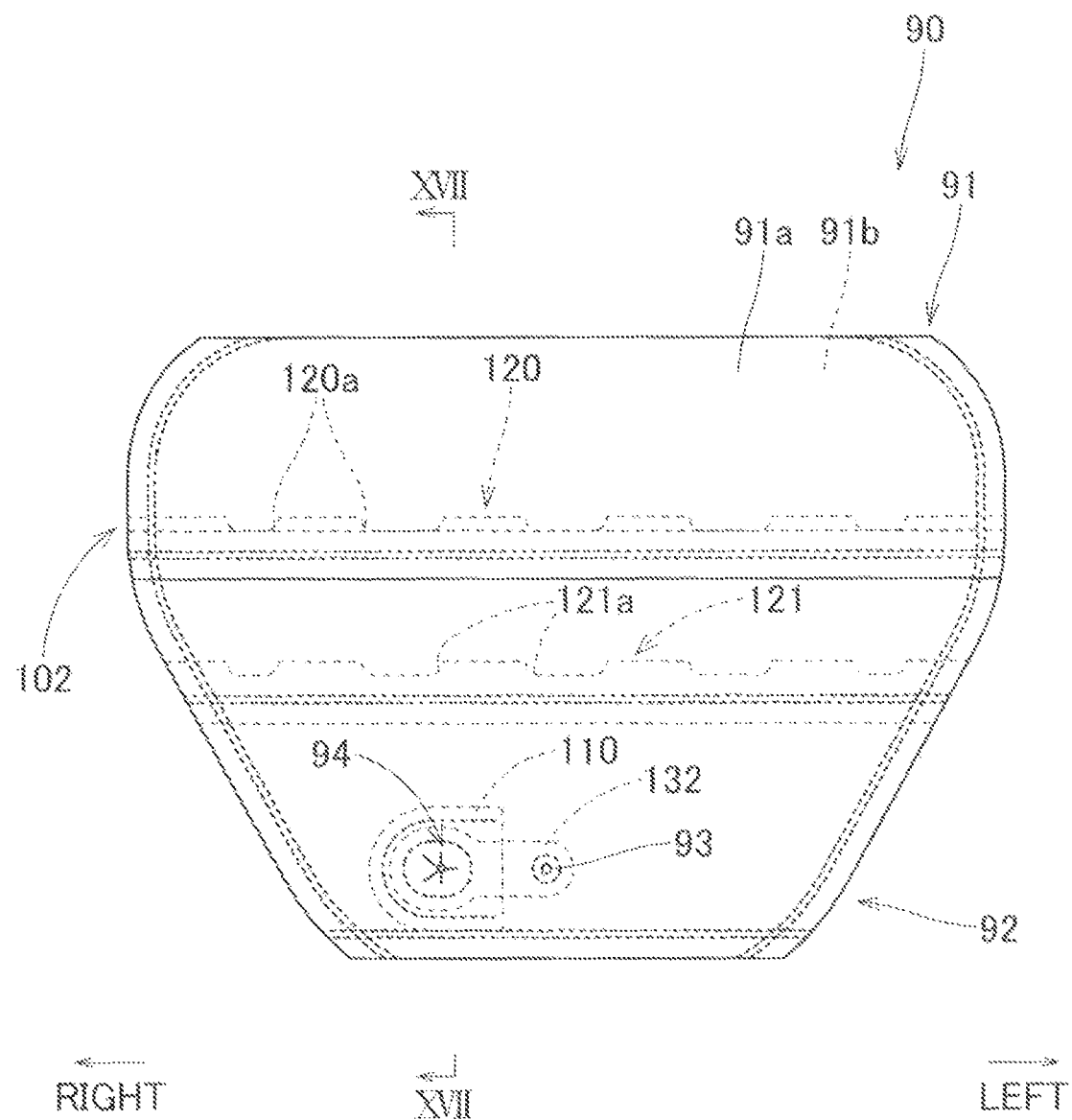
FIG. 16 is a back view of an airbag for use in the airbag device of the embodiment.
Figure 17:
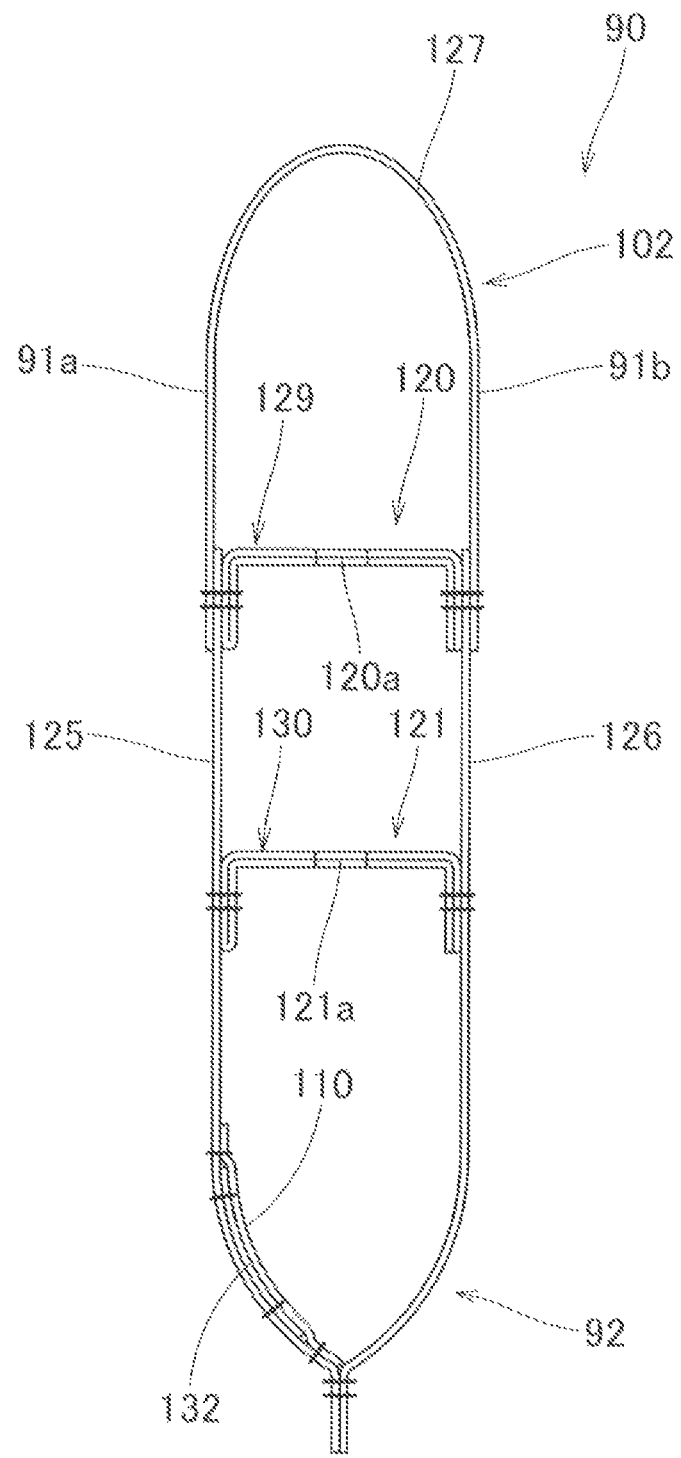
FIG. 17 is an enlarged sectional view of the airbag of FIG. 16 taken along line XVII-XVII.
Figure 19:
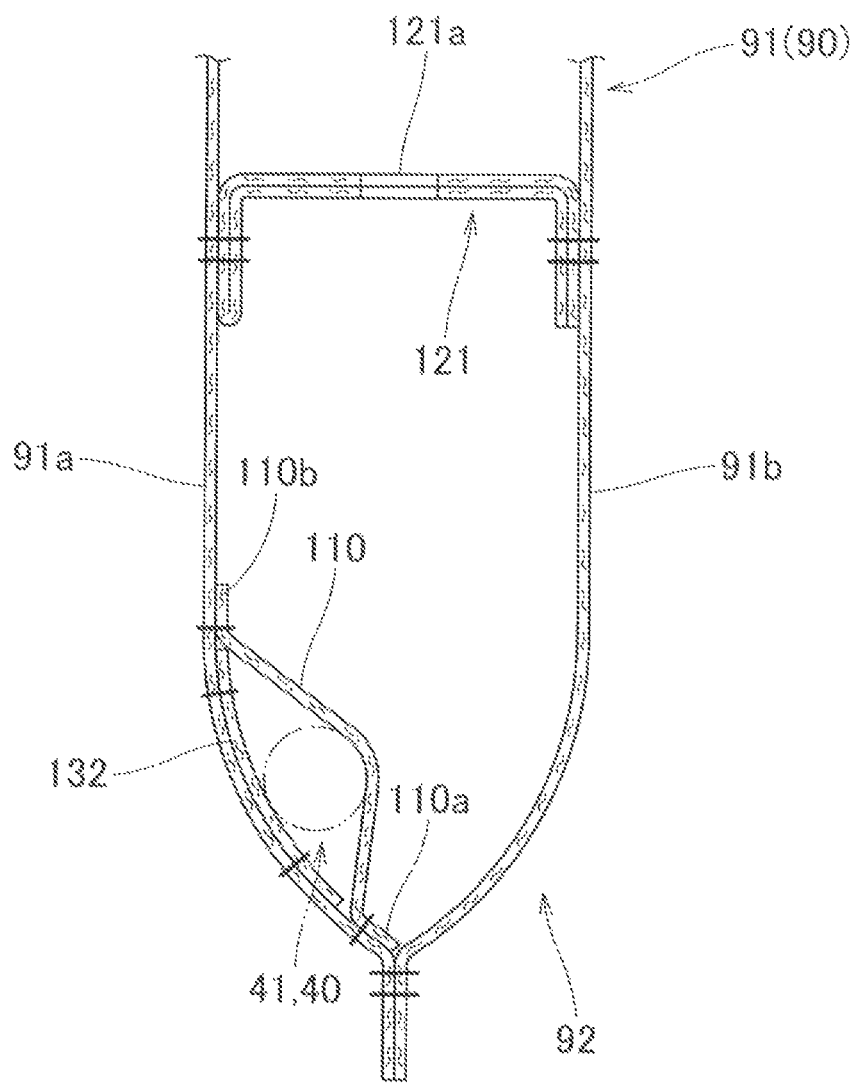
FIG. 19 is a partial enlarged vertical sectional view of the airbag showing especially a mount region.

As shown in FIGS. 16, 17 and 19, the airbag 90 of the illustrated embodiment includes a bag body 91, a flap member 110 disposed inside the bag body 91 and two tethers 120 and 121 disposed inside the bag body 91.

The bag body 91 is designed to be inflated into a generally rectangular board for protecting left and right knees K (KL and KR) of the driver D, as shown in FIG. 4 (double-dotted lines) and FIG. 16. As shown in FIG. 16, the bag body 91 is formed by joining together peripheral edges of two walls having generally identical contours; a vehicle body side wall 91a which is deployable towards the steering column 7 and an occupant side wall 91b which is deployable towards the driver's seat. The bag body 91 includes a mount region 92 which is disposed towards the case 28 when deployed and a protecting region 102 which is greater in width in a left and right direction than the mount region 92 and protects the driver's knees K (KL and KR).

Figure 18:
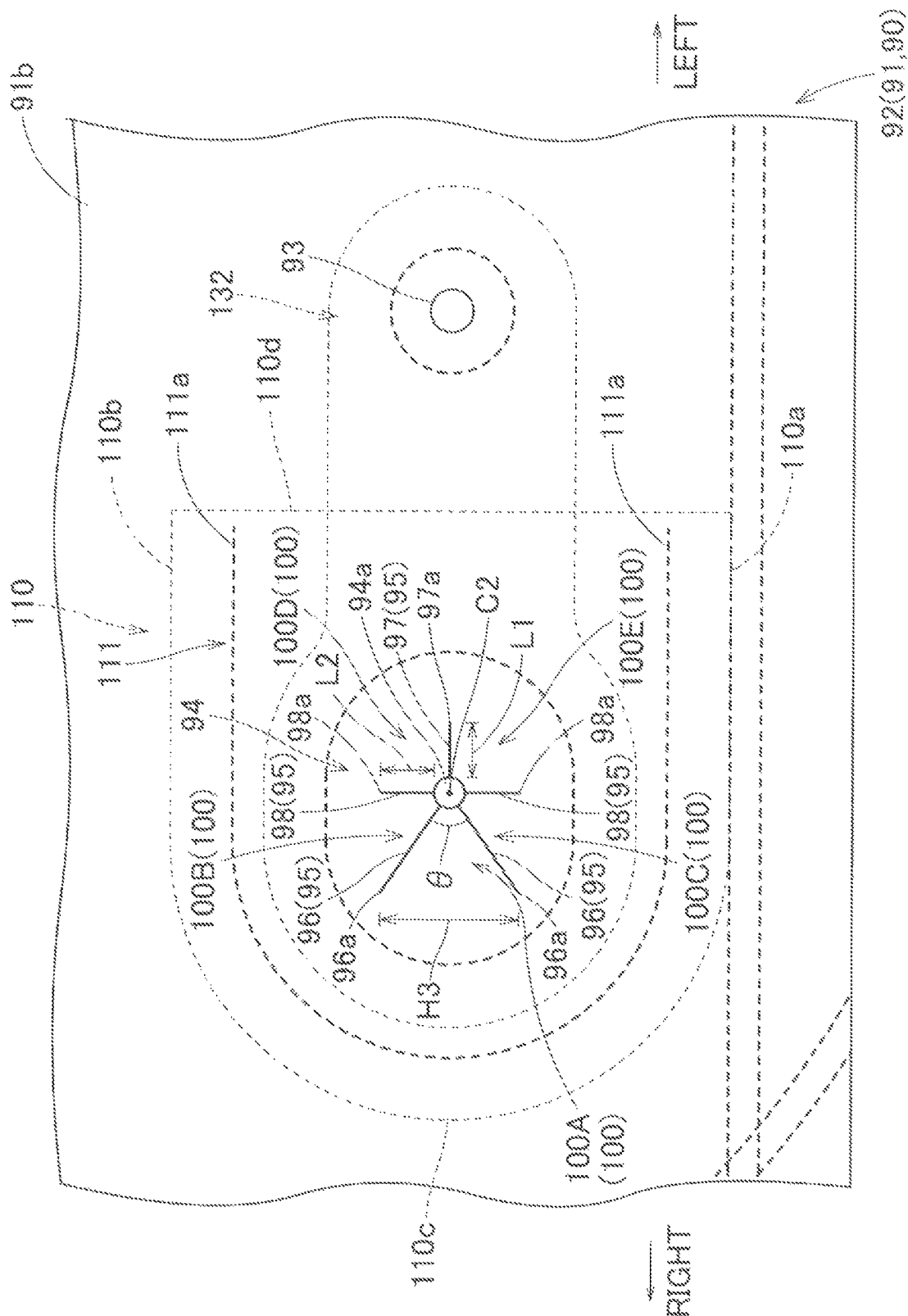
FIG. 18 is a partial enlarged back view of the airbag of FIG. 16 showing especially an insert opening.

As shown in FIGS. 16 and 18, the mount region 92 includes, on the vehicle body side wall 91a, an insert opening 94 via which the inflator body 41 is inserted into the bag body 91, and a mounting hole 93 out of which the bolt 85 of the retainer 55 protrudes. The insert opening 94 is formed in a vicinity of the right end of the mount region 92 and the mounting hole 93 is disposed to the left of the insert opening 94. In the illustrated embodiment, the mounting hole 93 is located slightly to the right of the center in a left and right direction of the bag body 91.

The insert opening 94 is composed of an opening-forming region which includes a plurality of slits 95 formed on the vehicle body side wall 91a. In the illustrated embodiment, more specifically, the insert opening 94 includes a small round aperture 94a which forms an insertion center C2 of the opening 94 as the inflator body 41 is inserted, and the slits 95 extending from the aperture 94a, as shown in FIG. 18. The slits 95 of the illustrated embodiment includes two retaining slits 96, a first auxiliary slit 97 and two second auxiliary slits 98. In the illustrated embodiment, the set of slits 95 generally forms symmetry with respect to a horizontal line running through the insertion center C2 (i.e. generally symmetric in an up and down direction as mounted on board) when the bag body 91 is flatly unfolded.

Figure 22:
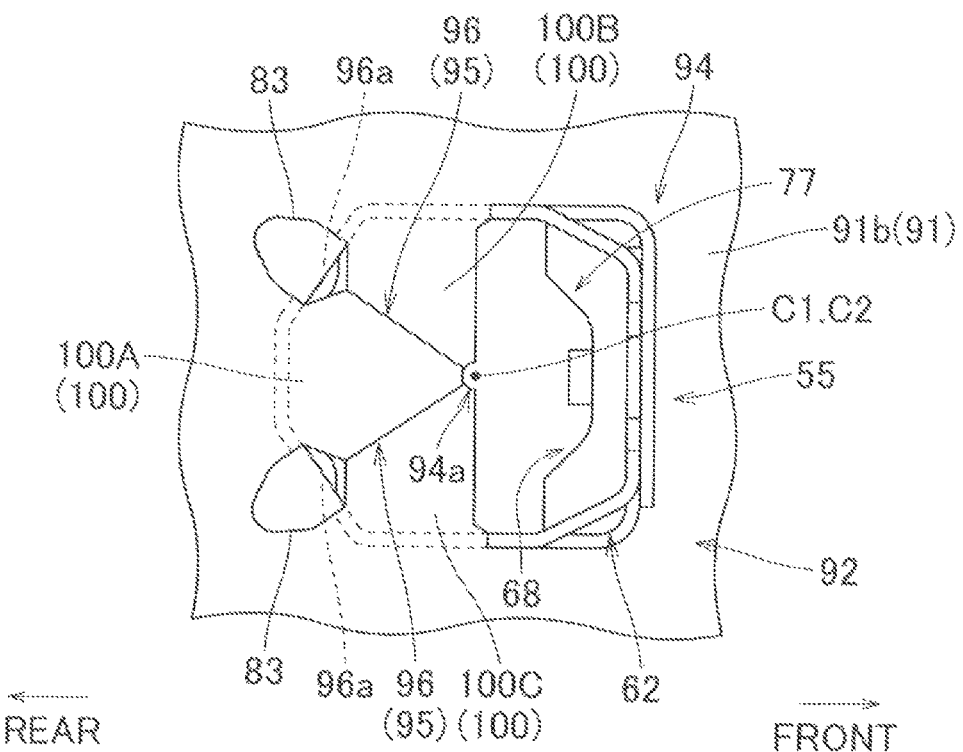
FIG. 22 is a diagram showing the insert opening of the airbag as the retainer is set inside the airbag.

When the bag body 91 is flatly unfolded as shown in FIG. 18, the two retaining slits 96 extend diagonally towards the right from the aperture 94a (i.e. the insertion center C2) such that the terminals 96a draw away from each other in a front and rear direction. That is, the retaining slits 96 intersect each other at the aperture 94a and adjoin each other on the right side of the aperture 94a. Further, the retaining slits 96 are configured to allow the retaining pawls 83 of the retainer 55 to protrude out of the terminals 96a as shown in FIG. 22, when the retainer 55 is disposed inside the airbag 90 (FIG. 22). That is, the distance H3 (FIG. 18) between the terminals 96a of the retaining slits 96 is the same as the clearance H2 between the retaining pawls 83 and generally the same as the diameter D2 of the inflator body 41. In the illustrated embodiment, the intersection angle θ (FIG. 18) between the two retaining slits 96 is approximately 80°. When mounted on board, the retaining slits 96 extend diagonally rearward from the aperture 94a in such a manner as to draw away from each other in an up and down direction.

When the bag body 91 is flatly unfolded as shown in FIG. 18, the first auxiliary slit 97 extends towards the left from the aperture 94a (i.e. the insertion center C2) in such a manner as to draw apart from the retaining slits 96. The first auxiliary slit 97 of the illustrated embodiment is formed into a straight line extending generally in a left and right direction. The length L1 of the first auxiliary slit 97 is approximately a half of the diameter D2 of the inflator body 41. When mounted on board, the first auxiliary slit 97 extends generally along a front and rear direction towards the bottom wall 29 of the case 28, i.e. towards the front, from the aperture 94a. The two second auxiliary slits 98 extend towards opposite directions from the aperture 94a, generally perpendicularly to the first auxiliary slit 97. When the bag body 91 is flatly unfolded as shown in FIG. 18, the second auxiliary slits 98 extend forward and backward from the aperture 94a (i.e. the insertion center C2). Each of the second auxiliary slits 98 of the illustrated embodiment is a straight line extending generally in a front and rear direction. The length L2 (FIG. 18) of each of the second auxiliary slits 98 is generally the same as the length L1 of the first auxiliary slit 97, i.e. approximately a half of the diameter D2 of the inflator body 41. That is, in the illustrated embodiment, the terminals 98a of the second auxiliary slits 98 are located on a same horizontal line as the terminals 96a of the retaining slits 96. When mounted on board, the second auxiliary slits 98 extend upward and downward from the aperture 94a (i.e. the insertion center C2) generally along an up and down direction. In order to prevent a wrong or incorrect assembly of the retainer 55, it is preferable that the first auxiliary slit 97 and second auxiliary slits 98 are disposed apart from the retaining slits 96, more particularly, in an opposite side to the retaining slits 96 with respect to the insertion center C2 (i.e. on a front side of the insertion center C2 as mounted on board, or at a position 180° apart from the retaining slits 96).

Figure 23:
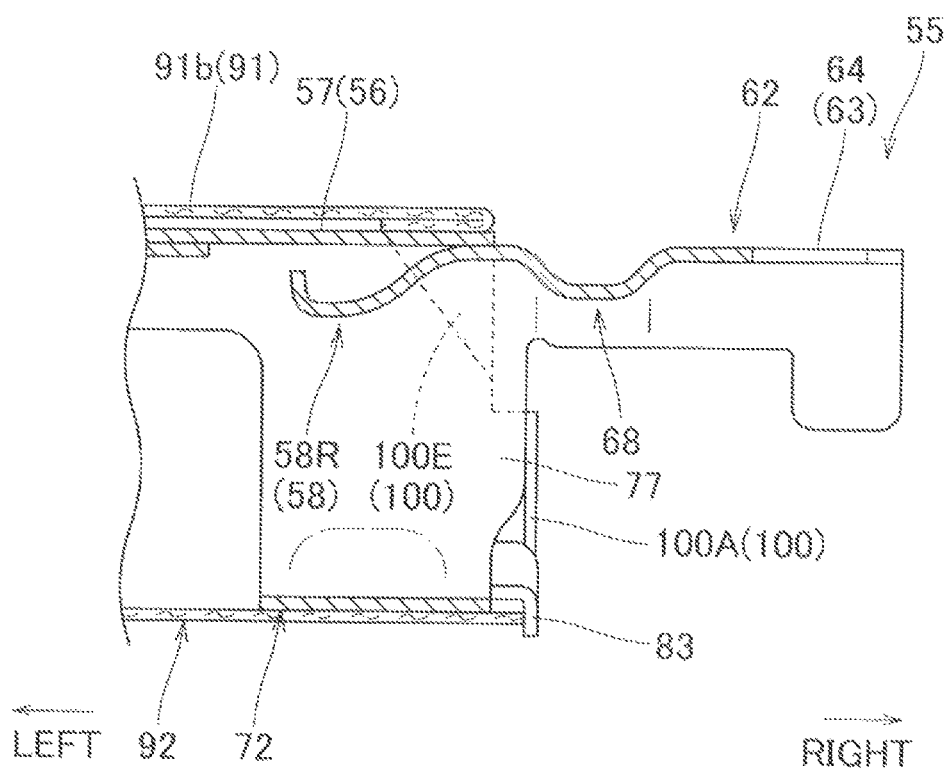
FIG. 23 is a schematic sectional view showing the insert opening of the airbag as the retainer is set inside the airbag.

When the inflator body 41 is inserted into the airbag 90 via the insert opening 94, areas among the retaining slits 96, first auxiliary slit 97 and second auxiliary slits 98 are folded inward and brought into contact with the outer circumference 41c of the inflator body 41, and each serves as a folded sealing region 100 for covering the outer circumference 41c of the inflator body 41. As shown in FIG. 18, five folded sealing regions 100A, 100B, 100C, 100D and 100E are provided in the illustrated embodiment. Each of the folded sealing regions 100 is folded on a straight line connecting adjoining leading ends 96a, 97a or 98a, and formed generally into a triangle. To describe more specifically, in the illustrated embodiment, the folded sealing regions 100D and 100E, which are composed of the areas between the first auxiliary slit 97 and second auxiliary slits 98 (i.e. the areas disposed in front of the insertion center C2 as mounted on board), are folded inward and brought into contact with the outer surfaces of the mounting base section 56 and holding section 72 of the retainer 55 when the retainer 55 is set inside the airbag 90 before the inflator 40 is inserted, as shown in FIG. 23.

Figure 25:
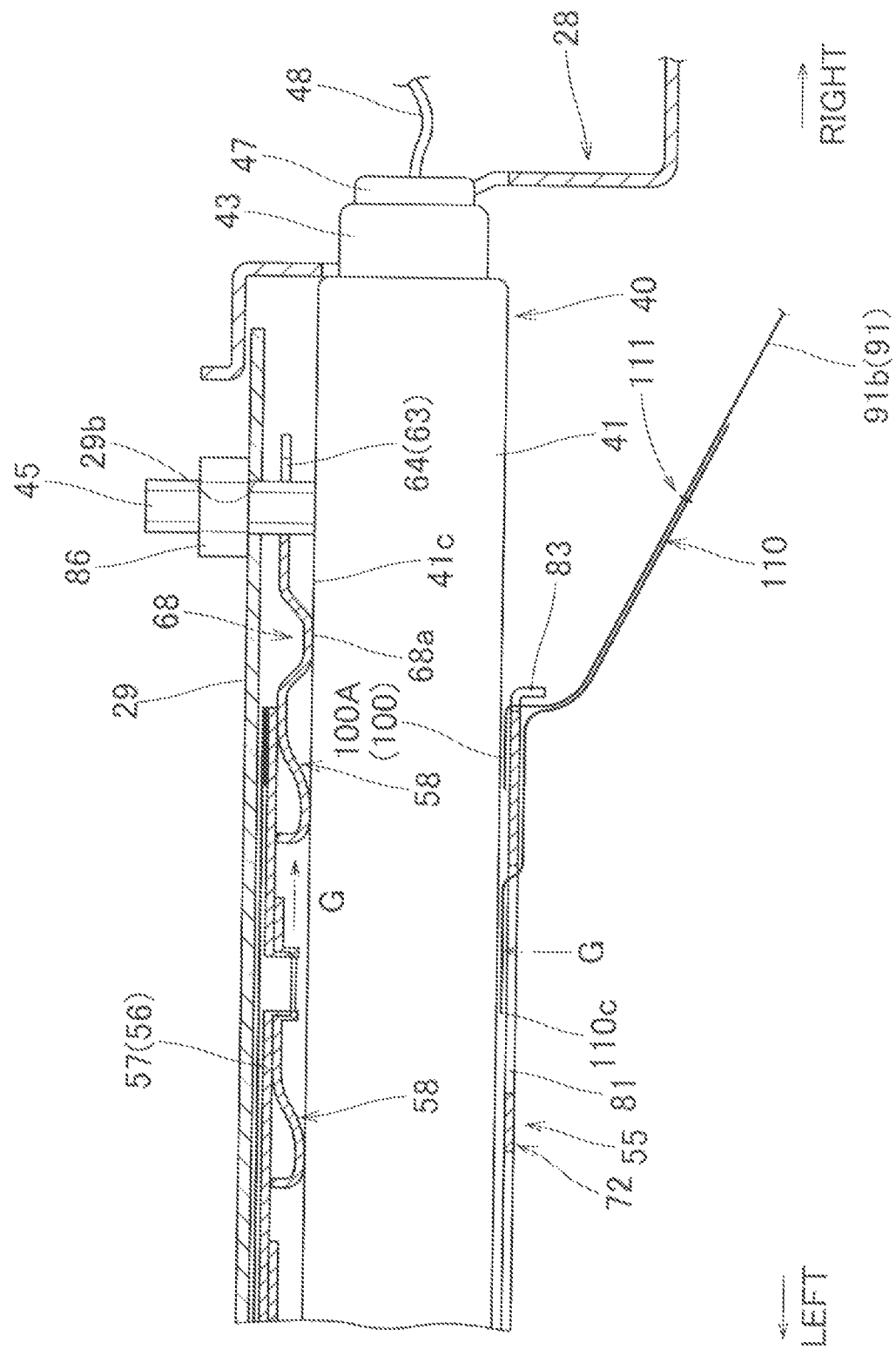
FIG. 25 is a partial enlarged horizontal sectional view of the airbag device of the illustrated embodiment at airbag deployment.

Referring to FIGS. 18 and 19, the flap member 110 is disposed inside the bag body 91 so as to cover the insert opening 94. The outer peripheral edge of the flap member 110 except the left edge 110c is joined to the vehicle body side wall 91a of the bag body 91. Specifically, the flap member 110 in a flattened state has such an outer contour that the front edge 110a and rear edge 110b are straight lines extending generally along a left and right direction, the left edge 110c is a straight line extending generally along a front and rear direction and the right edge 110d is a generally semicircular arc. The left edge 110c of the flap member 110, which is a free end, is located slightly to the left (i.e. towards the mounting hole 93) of the center of a clearance between the mounting hole 93 and the insertion center C2 (or aperture 94a) of the insert opening 94. The front edge 110a, right edge 110d and rear edge 110b of the flap member 110 are joined to the vehicle body side wall 91a of the bag body 91 with a single continuous seam 111 such that the flap member 110 closes off the insert opening 94 on the three sides except the left side. The seam 111 extends farther towards the left beyond the insert opening 94. When the retainer 55 is put inside the bag body 91, the flap member 110 covers the outer circumference of the holding section 72. When the airbag device S is mounted on board, as shown in FIGS. 25 and 26, the left edge 110c of the flap member 110 is disposed in the crimp opening 81 of the retainer 55, at the rear of the holding section 72. At airbag deployment, the flap member 110 is subjected to a pressing force of an inflation gas G and thrusts into the crimp opening 81, and is pressed onto the outer circumference 41c of the inflator body 41. Thus the left edge 110c region of the flap member 110 is forcefully pressed onto the outer circumference 41c of the inflator body 41 and prevents a gas leakage out of the insert opening 94.

The tethers 120 and 121 are disposed one above the other inside the bag body 91 and each extend generally along a left and right direction. The tethers 120 and 121 are provided to limit the thickness of the bag body 91 at deployment. The tether 120, which is disposed on the lower side, partitions the protecting region 102 from the mount region 92. The tether 121, which is disposed on the upper side, partitions the protecting region 102 into two in the middle. Each of the tethers 120 and 121 is provided with a plurality of gas communication holes 120a/121a for allowing gas communication.

Figure 21:
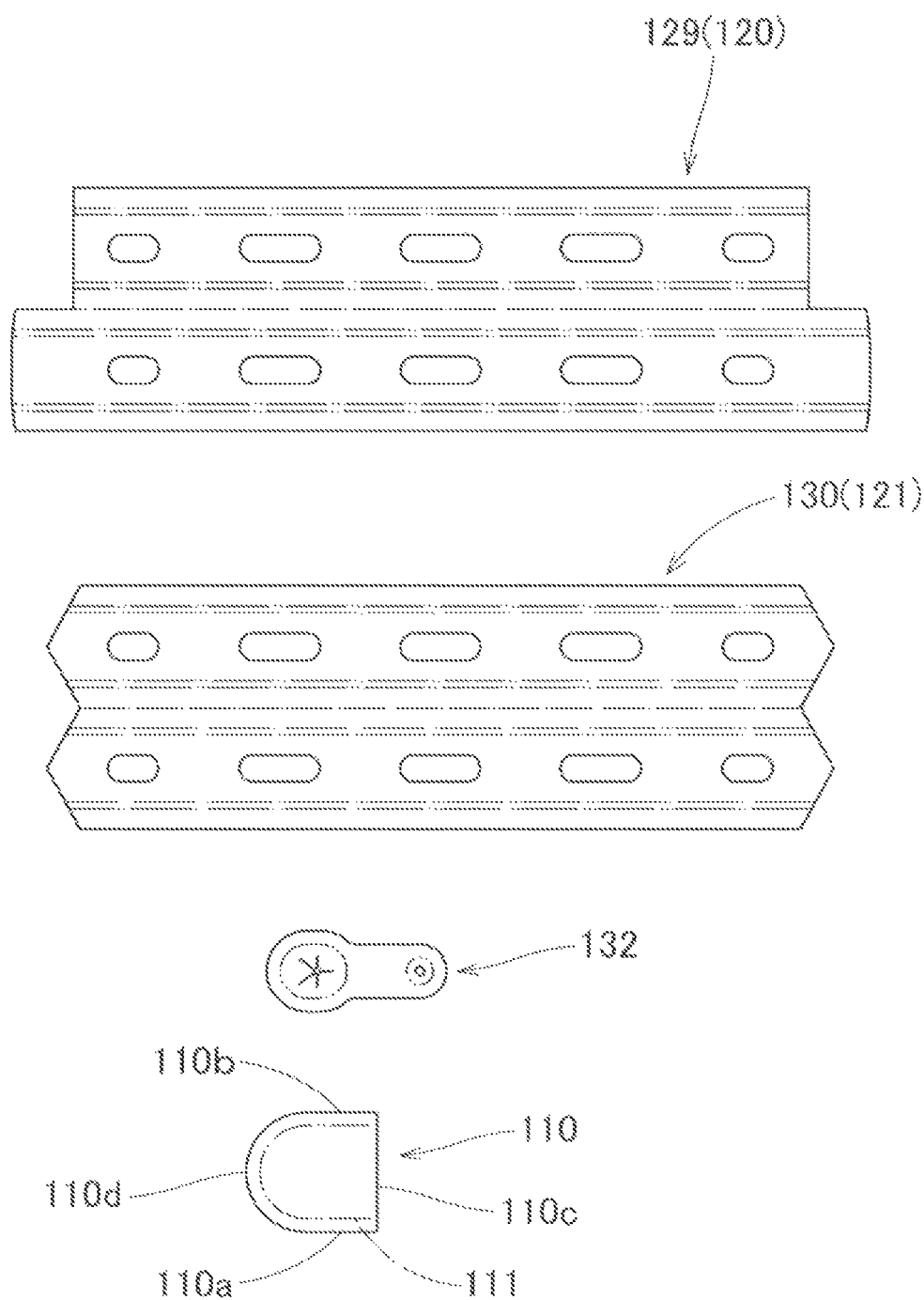

In the illustrated embodiment, the airbag 90 is composed of a plurality of base materials cut in predetermined contours. The base materials are formed of a fabric woven with polyester, polyamide yarns or the like, and the airbag 90 is formed by sewing the base materials together with a sewing thread. As shown in FIGS. 20 and 21, the airbag 90 of the illustrated embodiment is composed of three body base cloths 125, 126 and 127 for forming the vehicle body side wall 91a and occupant side wall 91b, two tether base cloths 129 and 130, the flap member 110 and a reinforcing cloth 132.

The body base cloth 125 forms an area of the vehicle body side wall 91a from the mount region 92 to the location of the upper tether 120 (i.e. an area of the vehicle body side wall 91a disposed below the upper tether 120). The body base cloth 126 forms an area of the occupant side panel 91b from the mount region 92 to the location of the tether 120 (i.e. an area of the occupant side wall 91b below the tether 120). The body base cloth 127 forms areas of the vehicle body side wall 91a and occupant side wall 91b above the tether 120. The tether base cloths 129 and 130 form the tethers 120 and 121 each in a doubled state. The reinforcing cloth 132 is used to reinforce an area encompassing the mounting hole 93 and insert opening 94, and is sewn to the vehicle body side wall 91a at the periphery of the mounting hole 93 and periphery of the insert opening 94.

Mounting of the airbag device S on the vehicle is now described. Firstly, the retainer 55 is put inside the airbag 90 via the insert opening 94 and disposed such that the bolt 85 protrudes out of the mounting hole 93. Then each of the retaining pawls 83 of the retainer 55 is taken out of a vicinity of each of the terminals 96a of the retaining slits 96 of the insert opening 94. At this time, as shown in FIG. 23, the folded sealing regions 100D and 100E, which are composed of the areas between the first auxiliary slit 97 and second auxiliary slits 98, are folded inward so as to cover the outer surfaces of the mounting base section 56 and holding section 72 of the retainer 55, such that the front area of the insert opening 94 is opened, as shown in FIG. 22. Then the airbag 90 is folded up so as to fit in the case 28, and wrapped up with a wrapping member (not shown) for keeping the folded-up configuration. The bolt 85 of the retainer 55 and the area around the insert opening 94 are taken out of the wrapping member, and the retaining pawls 83 of the retainer 55 are kept outside of the retaining slits 96.

Then the body 41 of the inflator 40 is set in the airbag 90 (i.e. in the holding section 72 of the retainer 55) via the insert opening 94, from the gas release section 42, and the bolt 45 of the inflator body 41 is pushed into the dent body 64 of the storing dent section 63 of the retainer 55 until it abuts against the left edge 65a of the peripheral region 65. At this time, the folded sealing regions 100A, 100B and 100C formed among the retaining slits 96 and second auxiliary slits 98 are folded inward and disposed between the inflator body 41 and holding section 72 of the retainer 55 so as to cover the outer circumference 41c of the inflator body 41, as shown in FIG. 24. The elastically deformable support regions 58 and the butt regions 78 hold the inflator body 41 from moving both in the axial direction and in a direction perpendicular to the axis, thus the holding section 72 provisionally supports the inflator body 41. Thereafter, the airbag 90 and the inflator 40 are stored in the case 28 such that the bolts 45 and 85 protrude out of the apertures 29a and 29b of the bottom wall 29, and the bolts 45 and 85 are fastened with the nuts 86. Thus the airbag 90 and inflator 40 are mounted on the bottom wall (i.e. vehicle body member) 29 of the case 28. At this time, due to fastening with the nuts 86, the edges 68b of the leading end region 68a of the pressing section 68 in the retainer 55 are deformed and a generally entire, continuous area of the leading end region 68a of the pressing section 68 is pressed onto the outer circumference 41c of the inflator body 41 (specifically, onto the outer circumference 41c of the front area of the inflator body 41 facing towards the mounting base section 56). The body 41 of the inflator 40 is thus prevented from slipping with respect to the retainer 55 by the bolt 45 and pressing section 68 located proximate to the bolt 45, and secured to the bottom wall 29 tightly.

Thereafter, the airbag cover 16 is assembled with the case 28 by having the hooks 32a and 33a engaged with peripheral areas of the retaining holes 21a and 22a, such that an airbag module is completed. This airbag module is mounted on the vehicle body structure 1 with the aid of the brackets 4. In the meantime, the connector 47 provided with a lead wire 48 leading to an airbag actuating circuit is connected with the connection port 43 of the inflator body 41 exposed from the through opening 35R of the case 28. If then the dashboard 12 and undercover 13 (FIGS. 1 and 2) are mounted, the airbag device S is mounted on the vehicle.

After the airbag device S is mounted on the vehicle, if an actuating signal is fed to the inflator body 41 via the lead wire 48, the inflator body 41 will emit an inflation gas out of the gas discharge ports 42a into the airbag 90 via the outlet openings 72b and 72c of the holding section 72 of the retainer 55. Then the airbag 90 will inflate and break the wrapping member, push the door 18 of the airbag cover 16, and the door 18 will open upward and downward about the hinges 20 along with rupture of the breakable region 19, such that the airbag body 91 will emerge out of the emergence opening 28a of the case 28 and deploy rearwardly as indicated by double-dotted lines in FIGS. 1 and 4.

In the airbag device S of the illustrated embodiment, the mounting base section 56 of the retainer 55 includes the storing dent section 63 for receiving the bolt (i.e. first mounting means) 45 of the inflator 40, and the pressing section 68 which is adapted to be brought into close contact with a predetermined circumferential area of the inflator body 41 when the airbag device S is fastened to the bottom wall 29 of the case 28 through the use of the bolt 45 of the inflator 40. Specifically, the pressing section 68 is disposed at a position between the bolt (i.e. second mounting means) 85 of the retainer 55 and the storing dent section 63 and proximate to the storing dent section 63, and is adapted to be brought into close contact with the outer circumference 41c of a portion of the inflator body 41 facing towards the mounting base section 56, as shown in FIG. 15. In the airbag device S of the illustrated embodiment, an inflation gas G exiting the gas release section 42 of the inflator 40 mainly flows into the airbag 90 via the outlet openings 72b and 72c of the holding section 72. Since the gas discharge ports 42a are arranged radially, a part of the gas G flows through a gap between the mounting base section 56 and inflator body 41 as well, as shown in FIG. 25. However, in the airbag device S, when the bolt 45 is secured to the bottom wall 29, the pressing section 68 is brought into close contact with outer circumference 41c of the portion of the inflator body 41 facing towards the mounting base section 56. More particularly, as shown in FIG. 15, the leading end 68a region, i.e. the annular portion, of the pressing section 68 is brought into close contact with the outer circumference 41c of the inflator body 41 by its extensive and continuous area in the circumferential direction. Accordingly, the pressing section 68 is capable of preventing the inflation gas G from flowing towards the insert opening 94 of the airbag 90 or further towards the bolt 45. Thus the airbag 90 will inflate quickly with little fear of gas leakage despite the configuration that an area of the inflator 40 having the bolt 45 is disposed outside of the airbag 90. In the illustrated embodiment, moreover, a strong pressing by the pressing section 68 will not occur until the bolt 45 is secured to the vehicle body member (i.e. bottom wall 29 of the case 28). Accordingly, the pressing section 68 will not hinder an insertion work of the inflator body 41 into the holding section 72 of the retainer 55.

Therefore, the airbag device S is capable of inflating the airbag 90 smoothly with little fear of gas leakage via a gap between the inflator 40 and retainer 55.

The pressing section 68 of the illustrated embodiment is so configured that the sectional contour as taken along the axis of the inflator body 41 rises gently from the mounting base section 56. With this configuration, the pressing section 68 will serve as a guide for insertion of the inflator body 41 into the holding section 72 of the retainer 55 via the insert opening 94 of the airbag 90. To describe more specifically, when the inflator body 41 is inserted into the holding section 72, if an edge 41ae (FIG. 14) of the leading end 41a of the inflator body 41 is placed on the rising plane 68c of the pressing section 68 and the inflator body 41 is then slid on the rising plane 68c, the axial center of the inflator body 41 will easily align with the center of the holding section 72, and the inflator body 41 will be smoothly inserted into the holding section 72.

In the illustrated embodiment, especially, the pressing section 68 is formed into such a generally quarter annular shape as to fit the outer circumference 41a of the inflator body 41. In other words, the pressing section 68 is configured to be brought into close contact with a generally quarter circumferential area of the inflator body 41. This configuration will facilitate the center alignment of the inflator body 41 and holding section 72 when the inflator body 41 is inserted into the holding section 72.

Although the illustrated embodiment has been described as applied to the airbag device S for knee protection, application of the invention should not be limited thereby. The invention may also be applied to a side airbag device which is adapted to be mounted on a backrest of a seat of a vehicle, by way of example.

What is claimed is:

1. An airbag device adapted to be mounted on a member of a vehicle, comprising:
   an airbag that is inflatable with an inflation gas;
   an inflator for feeding the airbag with the inflation gas, the inflator comprising:
      a body that is generally cylindrical in outer contour and provided with a gas release section for releasing the inflation gas; and
      a first mounting means that is adapted to be mounted on the member of the vehicle to mount the airbag and inflator on the member of the vehicle, the first mounting means protruding from a first end region of the body in a direction generally perpendicular to an axis of the body; and
   a retainer that is used to mount the airbag and the inflator on the member of the vehicle and that holds the inflator such that a location of the gas release section is disposed inside the airbag and the first end region having the first mounting means protrudes out of an insert opening of the airbag, the retainer comprising:
      a mounting base section that is adapted to be disposed generally along the member of the vehicle;
      a holding section that is disposed inside the airbag and is generally tubular in outer contour for receiving and holding the inflator, the holding section extending from the mounting base section;
      a second mounting means that is disposed at a first end region of the mounting base section, the second mounting means protruding in a direction generally perpendicular to the axis of the body of the inflator and going through and projecting out of the airbag, the second mounting means being adapted to be mounted on the member of the vehicle together with the first mounting means of the inflator in order to mount the airbag and the inflator on the member of the vehicle;
      a storing dent section for receiving the first mounting means of the inflator so as to conform a protruding orientation of the first mounting means to that of the second mounting means, the storing dent section being disposed at a second end region of the mounting base section distant from the second mounting means; and
      a pressing section that is adapted to be brought into close contact with a circumferential area of the body of the inflator facing towards the mounting base section when the first mounting means of the inflator is secured to the member of the vehicle, the pressing section being disposed at a position between the second mounting means and the storing dent section and proximate to the storing dent section,
   wherein, as viewed from an axial direction of the body of the inflator, the pressing section extends from both directions toward the first mounting means along a circumferential direction of the body of the inflator; and
   wherein, in a cross-section taken along the direction perpendicular to the body of the inflator, a leading end region of the pressing section has such a curved shape that opposite ends in the circumferential direction of the body of the inflator of the pressing section face away from the first mounting means, such that the leading end region contacts a continuous area of an outer circumference of the body of the inflator.

2. The airbag device of claim 1, wherein the pressing section is configured to rise gently from the mounting base section in a sectional view taken along the axis of the body of the inflator.

3. The airbag device of claim 1, wherein the pressing section is configured to be brought into close contact with a generally quarter circumferential area of the body of the inflator.

4. The airbag device of claim 1 adapted to be mounted on the member of vehicle which is disposed vertically such that the airbag is deployable rearwards and upwards for protecting knees of a vehicle occupant.

* * * * *